(12) United States Patent
Jung et al.

(10) Patent No.: US 10,171,731 B2
(45) Date of Patent: Jan. 1, 2019

(54) METHOD AND APPARATUS FOR IMAGE PROCESSING

(71) Applicant: Samsung Electronics Co., Ltd., Gyonggi-do (KR)

(72) Inventors: Eui-Chang Jung, Seoul (KR); Eun-Seok Ryu, Seoul (KR); Su-Ha Yoon, Seoul (KR); Cheol-Ho Cheong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 58 days.

(21) Appl. No.: 14/943,196

(22) Filed: Nov. 17, 2015

(65) Prior Publication Data
US 2016/0142629 A1    May 19, 2016

(30) Foreign Application Priority Data
Nov. 17, 2014    (KR) .................. 10-2014-0160124

(51) Int. Cl.
| | |
|---|---|
| *H04N 5/232* | (2006.01) |
| *H04N 5/247* | (2006.01) |
| *H04N 5/268* | (2006.01) |
| *H04N 21/81* | (2011.01) |
| *H04N 21/44* | (2011.01) |
| *H04N 21/414* | (2011.01) |
| *H04N 21/4788* | (2011.01) |

(Continued)

(52) U.S. Cl.
CPC ..... *H04N 5/23229* (2013.01); *G06K 9/00671* (2013.01); *G06K 9/00677* (2013.01); *H04N 5/23206* (2013.01); *H04N 5/23216* (2013.01); *H04N 5/23219* (2013.01); *H04N 5/23293* (2013.01); *H04N 5/247* (2013.01); *H04N 21/41407* (2013.01); *H04N 21/44008* (2013.01); *H04N 21/4788* (2013.01); *H04N 21/8153* (2013.01); *H04N 5/268* (2013.01)

(58) Field of Classification Search
CPC .......... H04N 5/23206; H04N 5/23216; H04N 5/23219; H04N 5/23293; H04N 5/23229; H04N 21/41407; H04N 21/44008; G06K 9/00664; G06K 9/00671; G06K 9/00677
See application file for complete search history.

(56) References Cited

U.S. PATENT DOCUMENTS

| | | | | |
|---|---|---|---|---|
| 5,850,352 | A | * 12/1998 | Moezzi | ................ H04N 5/222 345/419 |
| 2010/0091011 | A1 | * 4/2010 | Arrasvuori | ........ G06F 17/30241 345/418 |
| 2011/0069179 | A1 | 3/2011 | Bathiche et al. | |

(Continued)

FOREIGN PATENT DOCUMENTS

| | | |
|---|---|---|
| KR | 10-2006-0056125 A | 5/2006 |
| KR | 10-2014-0004448 A | 1/2014 |

*Primary Examiner* — Daniel M Pasiewicz
(74) *Attorney, Agent, or Firm* — Cha & Reiter, LLC.

(57) ABSTRACT

An electronic device comprising: a memory; and at least one processor operatively coupled to the memory, the processor being configured to: acquire a first and a second image, identify a first feature in the first image, and a second feature in the second image, generate a first relation information item based on the first feature and the second feature, and generate image data comprising at least a part of the first image or at least a part of the second image, based on the first relation information item.

18 Claims, 12 Drawing Sheets

(51) Int. Cl.
*H04N 9/00* (2006.01)
*G06K 9/00* (2006.01)

(56) References Cited

U.S. PATENT DOCUMENTS

| | | | |
|---|---|---|---|
| 2013/0177293 A1* | 7/2013 | Mate | H04N 9/8205 386/239 |
| 2014/0111611 A1 | 4/2014 | Lecroart | |
| 2014/0218532 A1* | 8/2014 | Nerayoff | H04N 7/181 348/148 |
| 2015/0179223 A1* | 6/2015 | Leppanen | G11B 27/034 386/282 |
| 2015/0193186 A1 | 7/2015 | Lee et al. | |
| 2016/0104357 A1* | 4/2016 | Miyano | G06K 9/00677 348/154 |

\* cited by examiner

METHOD AND APPARATUS FOR IMAGE PROCESSING

CLAIM OF PRIORITY

This application claims the benefit under 35 U.S.C. § 119(a) of a Korean patent application filed on Nov. 17, 2014 in the Korean Intellectual Property Office and assigned Serial number 10-2014-0160124, the entire disclosure of which is hereby incorporated by reference.

BACKGROUND

1. Field of the Invention

The present disclosure relates to electronic devices, in general, and more particularly to a method and apparatus for image processing.

2. Description of the Related Art

As the spreading of electronic devices (e.g., smartphones or photographing devices) with cameras increases, electronic devices are becoming universal photographing means. For example, the electronic devices can photograph various objects even without special supplemental instruments.

As the spreading of the electronic devices is generalized, multiple electronic devices can photograph the same object. For example, the multiple electronic devices can photograph images having different views for the same object. Also, the electronic device can transmit the photographed images to other electronic devices, thereby sharing them with the other electronic devices. The electronic device can display a received image through a display.

SUMMARY

According to aspects of the disclosure, an electronic device is provided comprising: a memory; and at least one processor operatively coupled to the memory, the processor being configured to: acquire a first image and a second image, identify a first feature in the first image, and a second feature in the second image, generate a first relation information item based on the first feature and the second feature, and generate image data comprising at least a part of the first image or at least a part of the second image, based on the first relation information item.

According to aspects of the disclosure, an electronic device is provided comprising: a display; and at least one processor operatively coupled to the display, the at least one processor being configured to: acquire a first relation information item that is associated with a first image and a second image, display the first image on the display; superimpose, on the first image, a first connection guide associated with the second image, the first connection guide being superimposed based on the first relation information item, and display the second image in response to detecting an input associated with the first connection guide.

According to aspects of the disclosure, a method for image processing is provided, comprising: acquiring, by an electronic device, a first image and a second image; identifying a first feature in the first image, and a second feature in the second image; generating a first relation information item based on the first feature and the second feature; and generating image data comprising at least a part of the first image or at least a part of the second image, based on the first relation information item.

A computer-readable recording medium according to various exemplary embodiments may record a program for executing the operations of acquiring, by an electronic device, a first image and a second image; identifying a first feature in the first image, and a second feature in the second image; generating a first relation information item based on the first feature and the second feature; and generating image data comprising at least a part of the first image or at least a part of the second image, based on the first relation information item.

BRIEF DESCRIPTION OF THE DRAWINGS

The above features and advantages of the present invention will become more apparent from the following detailed description when taken in conjunction with the accompanying drawings in which.

DETAILED DESCRIPTION

Figure 1:
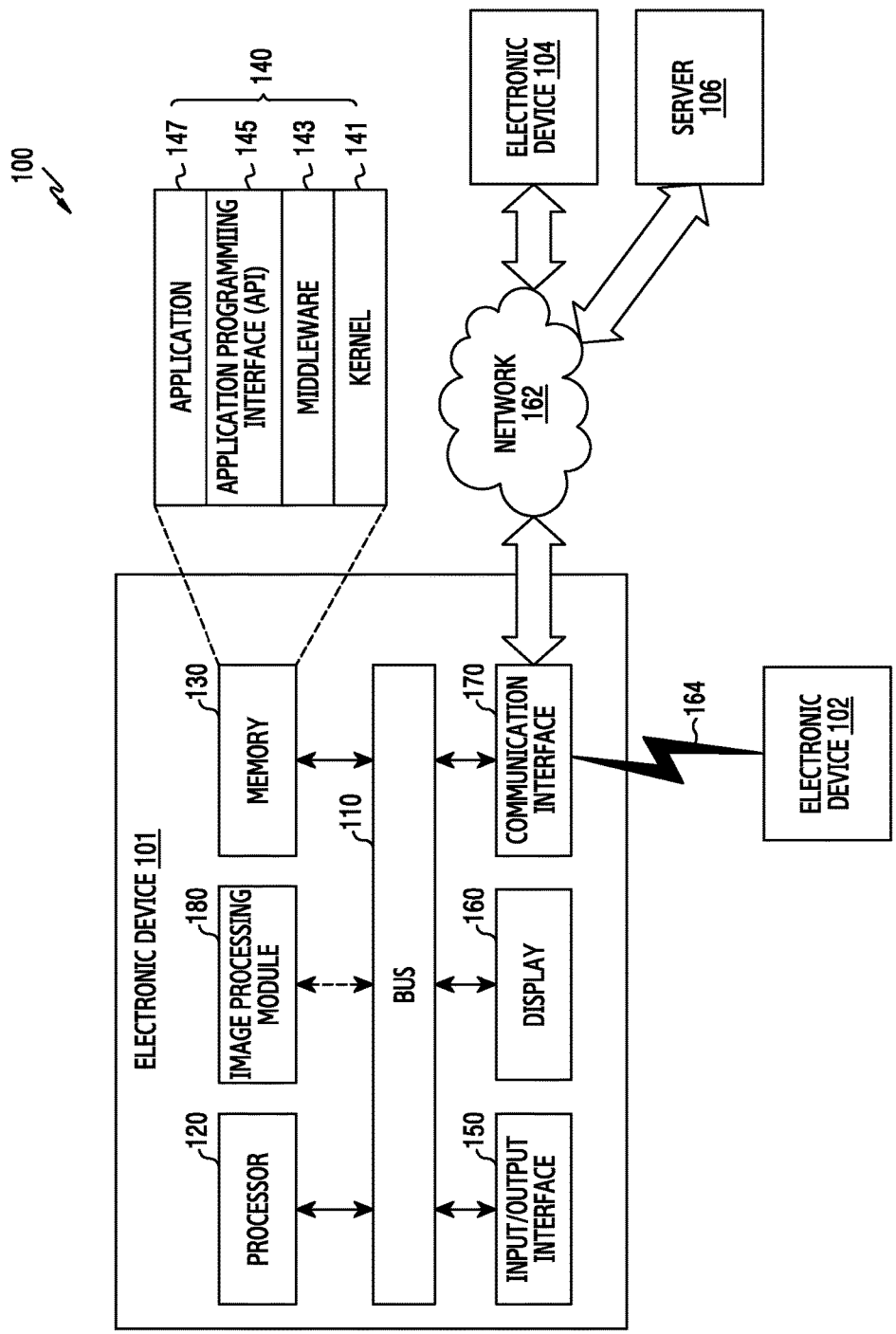
FIG. 1 is a diagram of an example of a network environment, according to various embodiments.

Hereinafter, the present disclosure is described with reference to the accompanying drawings. The present disclosure may be changed variously and have various embodiments, and specific embodiments are exemplarily described, and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described in the specification and do not exclude in advance existence or addition possibility of one or more other characteristics, numbers, steps, operations, elements, parts, or a combination of these.

Conjunctions such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on the context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., artificial intelligence electronic device) that uses the electronic device.

Referring to FIG. 1, an electronic device 101 within a network environment 100 according to various exemplary embodiments is mentioned. The electronic device 101 may include a bus 110, a processor 120, a memory 130, an input/output interface 150, a display 160, a communication interface 170, and an image processing module 180. In some exemplary embodiments, the electronic device 101 may omit at least one of the constituent elements or additionally have other constituent elements.

The bus 110 may be, for example, a circuit connecting the constituent elements 110 to 180 with one another and forwarding communication (e.g., a control message and/or data) among the constituent elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 120 may, for example, execute operation or data about control and/or communication of at least one other constituent element of the electronic device 101.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. The memory 130 may, for example, store an instruction or data related to at least one other constituent element of the electronic device 101. According to various exemplary embodiments, the memory 130 may store software and/or program 140. The program 140 may, for example, include a kernel 141, a middleware 143, an Application Programming Interface (API) 145, and/or an application program (or application) 147, etc. At least some of the kernel 141, the middleware 143, or the API 145 may be denoted as Operating Systems (OS).

The kernel 141 may control or manage system resources (e.g., the bus 110, the processor 120, or the memory 130, etc.) used to execute operations or functions implemented in the other programs (e.g., the middleware 143, the API 145, or the application program 147). Also, the kernel 141 may provide an interface of enabling the middleware 143, the API 145, or the application program 147 to access the individual constituent element of the electronic device 101, thereby controlling or managing the system resources.

The middleware 143 may, for example, perform a relay role of enabling the API 145 or the application program 147 to communicate and exchange data with the kernel 141.

Also, the middleware 143 may process one or more work requests received from the application program 147 in accordance with a priority order. For example, the middleware 143 may grant the priority order capable of using the system resources (e.g., the bus 110, the processor 120, or the memory 130, etc.) of the electronic device 101 to at least one of the application program 147. For instance, the middleware 143 may process the one or more work requests in accordance with the priority order granted to the at least one of the application program 147, thereby performing scheduling or load balancing for the one or more work requests.

The API 145 is an interface of enabling the application 147 to control a function provided by the kernel 141 or the middleware 143. The API 145 may, for example, include at least one interface or function (e.g., instruction) for file control, window control, image processing, or character control, etc.

The input/output interface 150 may play a role of forwarding an instruction or data inputted by a user or other external electronic devices to other constituent element(s) of the electronic device 101. Also, the input/output interface 150 may output an instruction or data received from the other constituent element(s) of the electronic device 101, to the user or other external electronic devices.

The display 160 may, for example, include a Liquid Crystal Display (LCD), a Light-Emitting Diode (LED) display, an Organic Light-Emitting Diode (OLED) display, or a MicroElectroMechanical Systems (MEMS) display, or an electronic paper display. The display 160 may, for example, display various contents (e.g., a text, an image, a video, an icon, or a symbol, etc.) to a user. The display 160 may include a touch screen, and may, for example, receive a touch, gesture, proximity, or hovering input using a part of an electronic pencil or a user's human body.

The communication interface 170 may, for example, establish communication between the electronic device 101 and the external electronic device (e.g., a first external electronic device 102, a second external electronic device 104, or a server 106). For example, the communication interface 170 may be connected to a network 162 through wireless communication or wired communication, and communicate with the external electronic device (e.g., the second external electronic device 104 or the server 106).

The wireless communication may, for example, use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)), as a cellular communication protocol. Also, the wireless communication may, for example, include a short-range communication 164. The short-range communication 164 may, for example, include at least one of Wireless Fidelity (WiFi), Bluetooth (BT), Near Field Communication (NFC), Global Positioning System (GPS). The wired communication may, for example, include at least one of a Universal Serial Bus (USB), a High-Definition Multimedia Interface (HDMI), a Recommended Standard-232 (RS-232), or a Plain Old Telephone Service (POTS), etc. The network 162 may include a telecommunications network, for example, at least one of a computer network (e.g., a Local Area Network (LAN) or a Wide Area Network (WAN)), the Internet, or a telephone network.

The image processing module 180 may acquire and process at least one image from the electronic device 101 or the external electronic device (e.g., the first external electronic device 102, the second external electronic device 104, or the server 106). For example, the image processing module 180 may associate the acquired images with one another or generate image data including at least a part of the acquired images.

In FIG. 1, the image processing module 180 is shown as a construction independent from the processor 120 and the memory 130, but various exemplary embodiments are not limited to this. The image processing module 180 may be, for example, implemented to be integrated with the processor 120, and may be implemented in such a manner that it can be stored in the memory 130 in a software form and be executed by the processor 120. Also, the image processing module 130 may be, for example, dispersed and implemented in the processor 120 and the memory 130. Supplemental information about the image processing module 180 is provided in relation with FIG. 4 to FIG. 12.

The first and second external electronic devices 102 and 104 each may be a device of the same or different kind as that of the electronic device 101. According to various exemplary embodiments, the server 106 may include a group of one or more servers. According to various exemplary embodiments, all or some of operations executed in the electronic device 101 may be executed in different one or multiple electronic devices (e.g., the electronic devices 102 and 104 or the server 106). According to various exemplary embodiments, in instances in which the electronic device 101 has to perform any function or service automatically or by a request, the electronic device 101 may send, instead of or additionally to executing the function or service in itself, a request for at least a partial function associated with this function or service to the other electronic devices (e.g., the electronic devices 102 and 104 or the server 106). The other electronic devices (e.g., the electronic devices 102 and 104 or the server 106) may execute the requested function or a supplemental function, and forward the execution result to the electronic device 101. The electronic device 101 may process the received execution result as it is or additionally, thereby providing the requested function or service. For this, for example, a cloud computing, dispersed computing, or client-server computing technology may be used.

Figure 2:
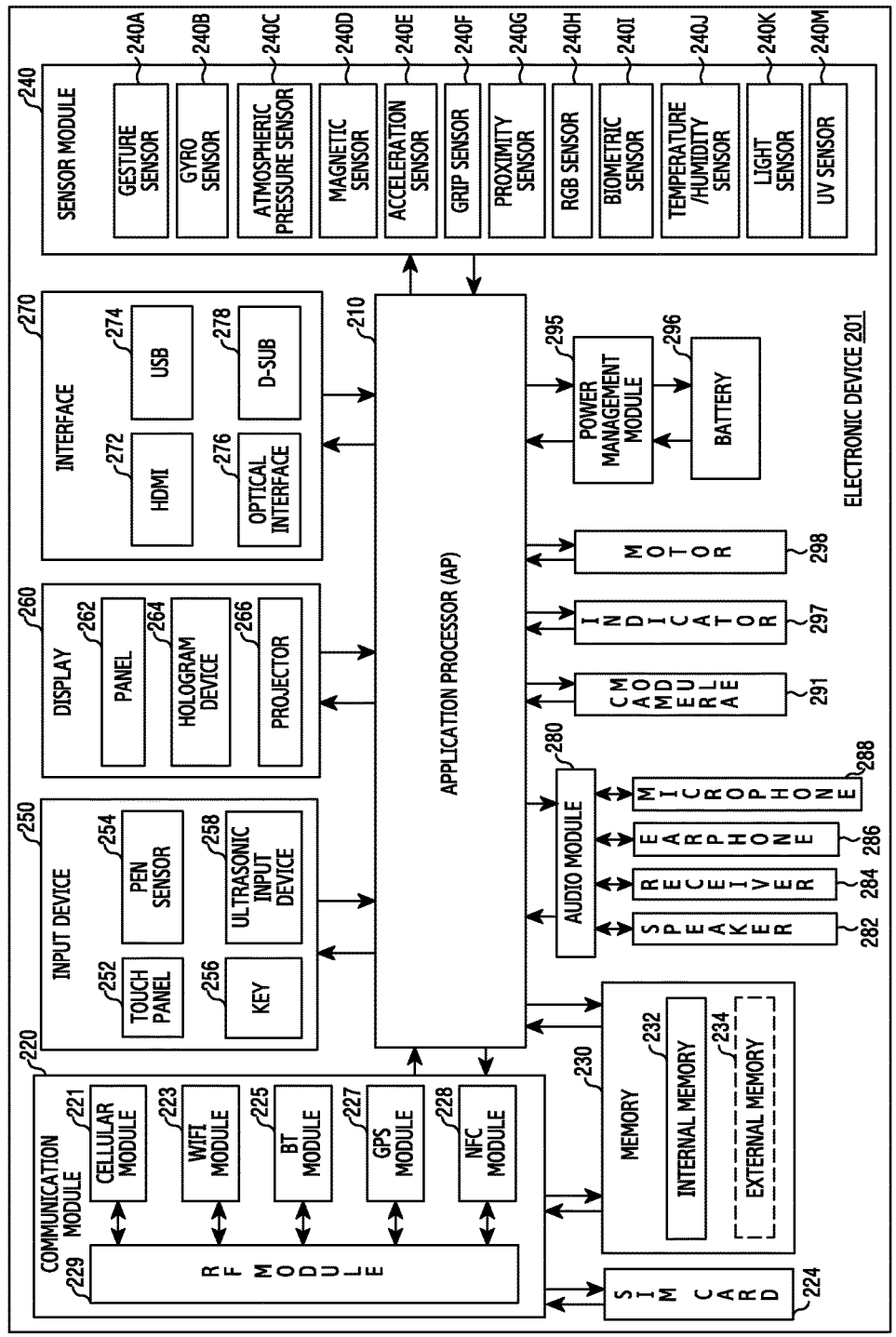
FIG. 2 illustrates a block diagram of an electronic device, according to various embodiments.

FIG. 2 is a block diagram of an example of an electronic device 201, according to various embodiments. The electronic device 201 may configure, for example, all or a portion of the electronic device 101 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include a graphic processing unit (GPU) (not shown).

The communication module 220 (e.g., the communication interface 170) may perform data transmission/reception in communication between the electronic device 201 (e.g., the electronic device 101) and other electronic devices (e.g., the electronic device 102, 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210. For example, the cellular module 221 may perform at least a portion of a multimedia control function.

According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

According to an embodiment, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected to the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultraviolet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage the power supply of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent overvoltage or overcurrent from being caused by a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Figure 3:
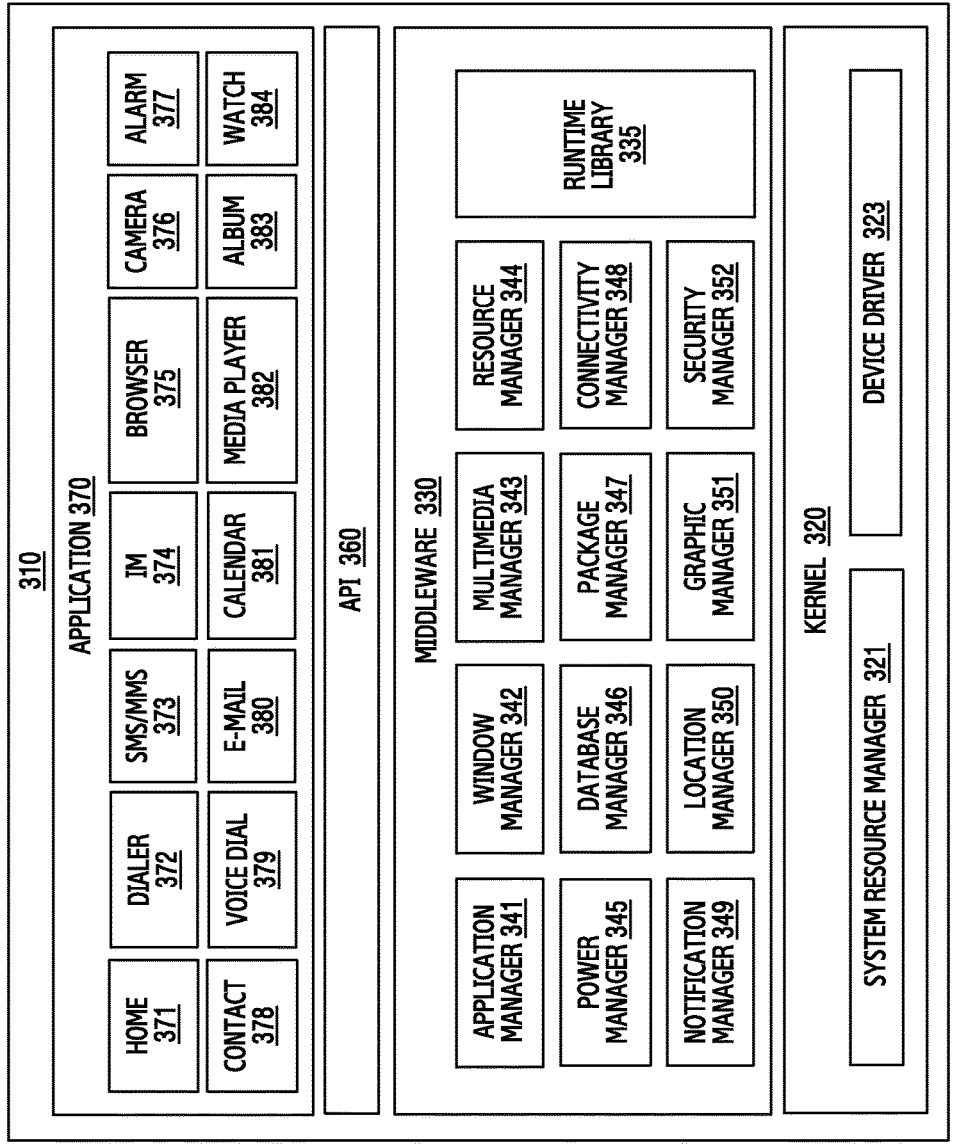
FIG. 3 is a block diagram of an example of a program module, according to various embodiments.

FIG. 3 is a block diagram of an example of a program module 310, according to various embodiments.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of a package file.

The connectivity manager 348 may manage, for example, Wi-Fi or Bluetooth wireless connection. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for ease of description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided by the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented in software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

The term "module" used in the present disclosure may refer to, for example, a unit including a combination of one or more hardware, software, or firmware. The term "module" may be interchangeably used with a term such as "unit," "logic," "logical block," "component," or "circuit," etc. The term "module" may refer to a minimum unit of an integrally configured part or a portion thereof. The term "module" may refer to a minimum unit performing one or more functions or a portion thereof. The term "module" may refer to a device that is mechanically or electronically implemented. For example, a "module" according to the present disclosure may include at least one of an Application-Specific Integrated Circuit (ASIC) chip, a Field-Programmable Gate Array (FPGA), or a programmable-logic device which are known, or will be developed in the future, and performing certain operations.

According to an embodiment of the present disclosure, at least a portion of an apparatus (e.g., modules or functions thereof) or a method (e.g., steps) according to the present disclosure may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The non-transitory computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, a Compact Disc Read-Only Memory (CD-ROM), optical media such as a Digital Versatile Disc (DVD), magneto-optical media such as a floptical disk, and a hardware device configured for storing and performing a program instruction (e.g., a programming module) such as a Read-Only Memory (ROM), a Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

Also, an embodiment of the present disclosure disclosed in the present disclosure and accompanying drawings merely suggest certain examples so as to easily describe the technological content of the present disclosure and help in the understanding of the present disclosure, and are not intended to limit the scope and spirit of the present disclosure. Accordingly, it should be understood that the scope of the present disclosure includes all modifications or changes made on the basis of the technological scope and spirit of the present disclosure, besides the embodiments disclosed herein, as defined by the appended claims and their equivalents.

Figure 4:
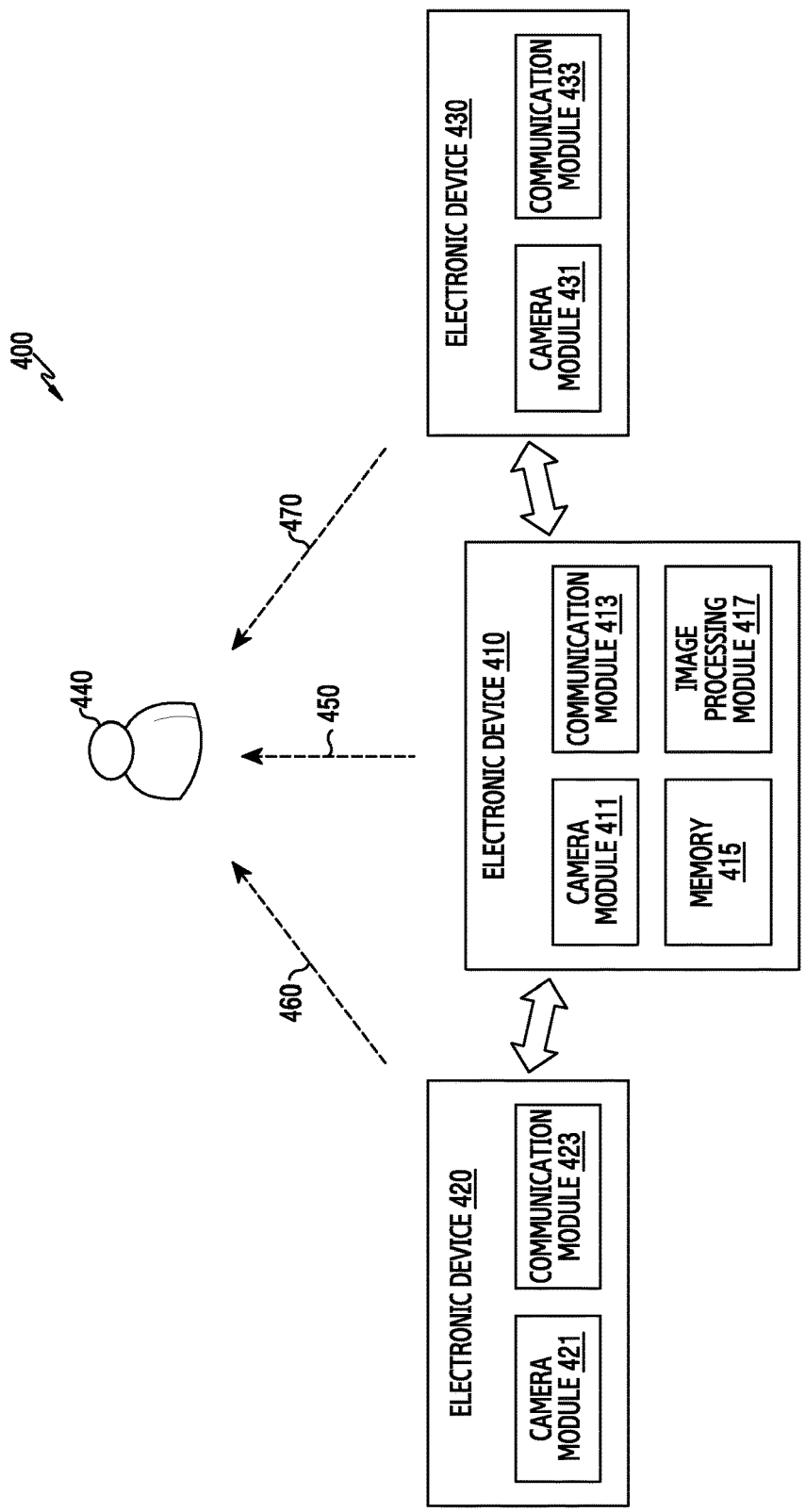
FIG. 4 is a diagram of an example of an image processing system, according to various embodiments.

FIG. 4 is a diagram of an example of an image processing system 400, according to various exemplary embodiments.

As illustrated, the image processing system 400 may include multiple electronic devices, for example, an electronic device 410 and external electronic devices 420 and 430. The electronic device 410 may, for example, include a camera module 411, a communication module 413, a memory 415, and an image processing module 417. The external electronic devices 420 and 430 may include camera modules 421 and 431 and communication modules 423 and 433, respectively. In some exemplary embodiments, the electronic devices 410, 420, and 430 may lack at least one of the aforementioned constituent elements or additionally have other constituent elements. For example, the electronic device 410 may be a server or may be a mobile device or photographing device with the camera module 411. According to the present example, the electronic device 410 includes the camera module 411, but various exemplary embodiments are not limited to this and the camera module 411 may not be included in the electronic device 410. For example, in instances in which the electronic device 410 is a server, the camera module 411 may not be installed within the electronic device 410.

The camera modules 411, 421, and 431 are modules for sensing (e.g., photographing) an image of an external object 440 and, for example, may correspond to the camera module 291 of FIG. 2. The communication modules 413, 423, and 433 are modules for transmitting or receiving information related to an image through wired/wireless connection with other devices. The communication modules 413, 423, and 433 may, for example, correspond to the communication module 220 and/or interface 270 of FIG. 2. The memory 415 is a module for storing an image sensed in the camera module 411 or an image received via the communication module 413, etc., and storing image data processed or generated by the image processing module 417. The memory 415 may, for example, correspond to the memory 230 of FIG. 2.

The image processing module 417 may, for example, acquire an image from the camera module 411 or the memory 415, or acquire an image from the external electronic devices 420 and 430 via the communication module 413. Based on relation information about the acquired images, the image processing module 417 may, for example, generate at least one of information related with the corresponding image or image data including at least a part of each of the acquired images. Afterwards, the electronic device 410 may store the image data in the memory 415 or provide (e.g., transmit) the image data to the external electronic devices 420 and 430 through the communication module 413. The image processing module 417 may, for example, be the image processing module 180 illustrated in FIG. 1.

According to one embodiment, in instances in which an image is a zoomed-in image that is generated by extracting (e.g., cropping) a portion of a full image frame, the image processing module 417 may separately acquire the remaining portion of the full image frame, together with the zoomed-in portion. For example, if the image processing module 417 photographs an object in a zoom-in mode, the image processing module 417 may separately acquire the remaining portion except for the zoomed-in portion without deleting the remaining portion. For example, the image processing module 417 may separately acquire the remaining portion excepting the zoomed-in portion which is cropped from the full image frame and subsequently upscaled. For instance, in instances in which the electronic device 410 is a server, the image processing module 417 may separately receive the remaining portion of the full image frame through the camera modules 421 and 431 included in the external electronic devices 420 and 430.

According to various exemplary embodiments, in instances in which an image is a zoomed-in image that is extracted from a full image frame, the image processing module 417 may associate the zoomed-in portion with the remaining portion of the full image frame. For example, the image processing module 417 may store the acquired remaining portion of the image frame in the memory 415 such that the acquired remaining portion is associated with the zoomed-in portion. For example, the image processing module 417 may integrate the remaining portion and the zoomed-in portion into one image data. Afterwards, the image processing module 417 may transmit the image data to the external electronic devices 420 and 430.

According to various exemplary embodiments, the image processing module 417 may independently separate and process the remaining portion and the zoomed-in portion (e.g., in parallel). For example, the image processing module 417 may store the acquired remaining portion at a location that is different from the location where the zoomed-in portion is stored, or transmit the acquired remaining portion to the external electronic device 420 and 430 through a channel different from a channel through which the zoomed-in portion is transmitted. For instance, the image processing module 417 may integrate the remaining portion and other images (not the zoomed-in portion) into one image data.

According to various exemplary embodiments, the image processing module 417 may generate relation information which indicates that a first image and a second image are related to each other. The relation information may, for example, include at least one of identification information associated with the first image and the second image, access information, synchronization information, photographing environment information, or information related to an object that is depicted in both the first image and the second image.

The identification information may, for example, include file names of the first image and the second image, serial numbers thereof, or tags thereof. Additionally or alternatively, the access information may, for example, include a Uniform Resource Locator (URL) for connecting to the first image and the second image, an Internet Protocol (IP) address, a Media Access Control (MAC) address, or a certificate of authentication. The synchronization information may, for example, include an indication of the duration of a first video including the first image is photographed and/or the duration of a second video including the second image. Additionally or alternatively, the synchronization information may include information for matching each unit image (e.g., a frame) photographed at each unit time during the first time duration to each unit image (e.g., a frame) photographed at each unit time during the second time duration, on a basis of an absolute time. For example, in instances in which it is determined that the first image is photographed at a first unit time during the first time duration, and the second image is photographed at a second unit time during the second time duration, the synchronization information may be used as information for associating the first image with a unit time corresponding to a first unit time during a third time duration and associating the second image with a unit time corresponding to a second unit time during the third time duration, in associating the first image and the second image with the third time duration including at least a partial duration of the first time duration and at least a partial duration of the second time duration.

The photographing environment information may, for example, include identification information related to the device(s) which captured the first image and the second image, attribute information, or setting information. For example, the identification information may include a manufacturing company of a camera or a mobile terminal including the camera, a model name thereof, a serial number thereof, or a tag thereof. The attribute information may include information related to a display included in the camera, a lens, a codec, and a sensor. The setting information may identify a setting of the device or a control instruction received by the device. For instance, the setting information may include an indication of an F stop, a shutter speed, an International Organization for Standardization (ISO) sensitivity, zoom-in or not, a resolution, a filter, an auto white balance, an autofocus, a high dynamic range, a global positioning system, the direction of a camera, a position, a flash, or a frame rate. The identification information, attribute information, or setting information may include any other suitable type of information in addition to (or instead of) the aforementioned examples. The present disclosure is not limited to any of the aforementioned examples.

According to various embodiments, the image processing module 417 may generate the image data based on relation information associated with a first image and a second image. The image processing module 417 may generate the image data in response to detecting that the first image and the second image are related to each other based on the relation information. According to various exemplary embodiments, the image processing module 417 may the generate image data including at least a part of a first image and at least a part of a second image. For example, the image processing module 417 may generate the image data by merging at least a portion of the first image with at least a portion of the second image. The image processing module 417 may, for example, generate the third image data by using various coding techniques such as MPEG Advanced Video Coding (AVC), Multiview Video Coding (MVC), High-Efficiency Video Coding (HEVC), or MultiView—High-Efficiency Video Coding (MV-HEVC), etc.

For example, the image processing module 417 may generate the image data by joining the first image and the second image in time order. Thus, in this example, the image data may be a video clip wherein a first frame is based on the first image and a subsequent second frame is based on the second image. In another example, the image processing module 417 may generate the image by combining the first image and the second image in a single still image. In this case, the image processing module 417 may generate image data of a form including all of the entire first image data and the entire second image data without compressing the first image data and the second image data.

For example, the image processing module 417 may generate the image data by spatially compressing the first image and the second image. For instance, the image processing module 417 may generate the image data by compressing the first image and the second image by including in the image data only portions of the second image that are not redundant with any portion of the second image. Thus, if the image processing module 417 determines that a first portion of the first image matches a second portion of the second image, the image processing module may include in the image data only one of the first portion and the second portion in order to eliminate the redundancy between the two images. Afterwards, the image data may be used to reconstitute any of the first image and the second image. Thus, in some aspects, the generation of the image data may be tantamount to compressing the first image and the second image.

According to various embodiments, the image processing module 417 may generate image data, based on synchronization information of a first image and a second image. For example, if determining that the first image and the second image are photographed at a specific time (or time window) identified by the synchronization information, the image processing module 417 may detect that the first image matches the second image. Afterwards, in response to detecting that the first image and the second image match, the image processing module 417 may generate the image data based on the first image and the second image.

According to various embodiments, the image processing module 417 may display a first image and a second image extracted from image data, through a display (not shown) operatively connected to the image processing module 417. For example, the image processing module 417 may reconstitute one of the first image and the second image data from the image data and display the reconstituted image. For example, the image processing module 417 may display the first image or the second image by real-time streaming. In another example, the image processing module 417 may display the first image or the second image by a unicast service or an evolved Multimedia Broadcasting and Multicast Service (eMBMS).

According to various embodiments, the image processing module 417 may transmit image data or relation information to the external electronic devices 420 and 430. For example, the image processing module 417 may transmit the image data or the relation information periodically. In another example, the image processing module 417 may transmit the image data or the relation information in response to the occurrence of a specific event. For instance, the image processing module 417 may transmit the image data or the relation information at a time an image which is being displayed on the display operatively connected to the image processing module 417 changes from a first frame to a second frame.

For example, the image processing module 417 may transmit the relation information to the external electronic devices 420 and 430 in a header associated with the image data. The header may be, for example, a header or extension region of a network abstraction layer. In another example, the header may be a slice header.

For example, the image processing module 417 may transmit the relation information to the external electronic devices 420 and 430 by inserting the relation information into a Supplemental Enhancement Information (SEI) or Video Usability Information (VUI) portion of the image data. For example, the image processing module 417 may insert the relation information into a part of supplemental enhancement information or video usability information corresponding to each of the first image and the second image, to transmit the image data. In another example, the image processing module 417 may tag the relation information associated with the first image and the second image onto each of the first image and the second image, to transmit the image data.

For example, the image processing module 417 may include the relation information as a part of metadata to transmit the relation information to the external electronic devices 420 and 430. For instance, the image processing module 417 may embed the relation information into the image data, thereby transmitting the relation information as a part of the image data. In another example, the image processing module 417 may encapsulate the relation information separately from the image data. In such instances, the image processing module 417 may transmit the relation information separately from the image data.

According to various embodiments, the image processing module 417 may receive image data and relation information from the external electronic devices 420 and 430 for the electronic device 410. For example, the image processing module 417 may receive the image data, and the relation information stored in a header of the image data. In another example, the image processing module 417 may receive the image data, and the relation information stored in supplemental enhancement information or video usability information of the image data. In another example, the image processing module 417 may receive the relation information included in the image data or stored in separate metadata. For example, the image processing module 417 may receive the relation information periodically or in response to the occurrence of a specific event.

According to various embodiments, the image processing module 417 may photograph an external object 440 based on photographing environment information (e.g., camera settings) received from the external electronic devices 420 and 430. For example, the image processing module 417 may set a photographing environment of the camera module 411 based on the received photographing environment information, thereby photographing the external object 440 in a photographing environment which is at least partially the same as photographing environments of the external electronic devices 420 and 430.

According to various embodiments, based on a first image, a second image, and relation information associated with the first image and the second image, the image processing module 417 may acquire information indicating the vantage points from which the first image and the second image are photographed and/or information identifying the object 440 that is depicted in the first image and the second image. In some implementations, the information indicating the vantage points from which the first image and the second image are photographed may include (and/or consist of) an indication of a respective viewing direction from which each of the first image and the second image is captured.

For example, based on the first image corresponding to a first view 460 of the object 440, the second image corresponding to a second view 470 of the object 470, or the relation information (e.g., photographing environment information and information related to the object 440 commonly included in the first image and the second image), the image processing module 417 may acquire angles related to the first view 460 and the second view 470. For example, the image processing module 417 may compare a representation of an object in the first image with a representation of the object in the second image to calculate the angles (e.g., viewing directions) from which the first image and the second image are captured. The image processing module 417 may acquire the angles at which the first image and the second image are photographed from one surface of the object 440, as angles corresponding to the first view 460 and second view 470 of the object 440, respectively. Also, the image processing module 417 may compute the angles at which the first image and the second image are photographed from one surface of the object 440, thereby calculating an angle between the viewing direction vector associated with the view 460 and the viewing direction vector associated with the view 470. The image processing module 417 may acquire the angle related to the first view 460 and the second view 470 automatically or by a user input.

For example, based on the first image corresponding to the first view 460 on the object 440, the second image corresponding to the second view 470, or the relation information (e.g., the photographing environment information and the information related to the object commonly included in the first image and the second image), the image processing module 417 may acquire a first distance between a vantage point from which the first image is captured (e.g., the position of the electronic device 420) and the object 440, as well as a second distance between the vantage point from which the second image is captured (e.g., the position of the electronic device 430) and the object 440. For example, the image processing module 417 may acquire a position of a first device (e.g., the external electronic device 420) photographing the first image and a position of a second device (e.g., the external electronic device 430) photographing the second image, from the photographing environment information (e.g., GPS information). For instance, the image processing module 417 may acquire photographing positions of multiple images using GPS information included in relation information. In another example, the image processing module 417 may acquire the photographing positions of the multiple images using a differential value by vector operations, in a process of comparing features extracted from the multiple images. For example, based on a photographing angle and photographing position of one surface of the object 440, the image processing module 417 may calculate a distance between the first device and the second device. In another example, the image processing module 417 may acquire distance information between an object measured by the camera module 411 or sensors installed in the external electronic devices 420 and 430 and a photographing device and, based on this, the image processing module 417 may calculate distances related to the first view 460 and the second view 470.

According to various embodiments, the image processing module 417 may sense at least one information related to a motion of the electronic device 410, through at least one sensor operatively connected to the electronic device 410. For example, the image processing module 417 may sense a direction or acceleration in which the electronic device 410 moves or a direction in which the electronic device 410 rotates with respect to a central axis of the electronic device 410. For instance, the image processing module 417 may sense a movement direction, a rotation direction, or an acceleration through an acceleration sensor or a gyro sensor, but various exemplary embodiments are not limited to this.

According to various embodiments, based on a first image, a second image, or relation information about the first image and the second image, the image processing module 417 may set a photographing view 450, and acquire a third image including the object 400 which is common to the first image and the second image.

Figure 5:
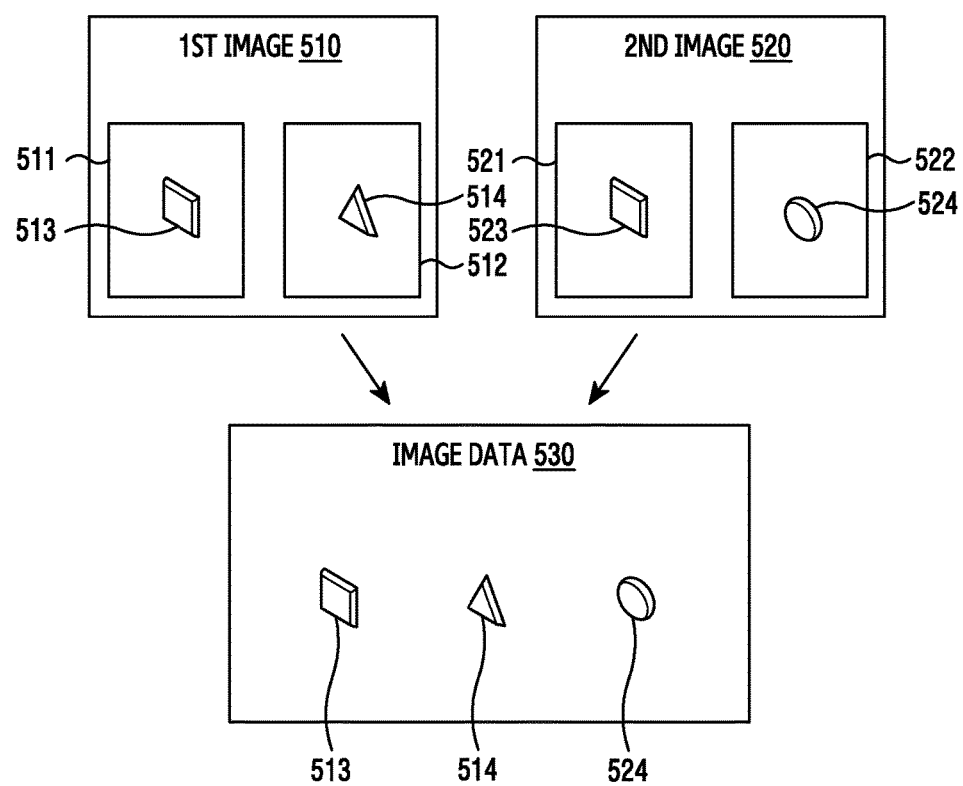
FIG. 5 is a diagram illustrating an example of a process for generating image data, according to various embodiments.

FIG. 5 is a diagram illustrating an example of a process for generating image data, according to various embodiments.

According to various embodiments, the image processing module may identify the first features 513 and 514 by processing first zones 511 and 512 of a first image 510. In addition, the image processing module may identify second features 523 and 524 by processing second zones 521 and 522 of a second image 520. For example, the image processing module may select the first zones 511 and 512 and the second zones 521 and 522 which are partial zones dividing each of the first image 510 and the second image 520, respectively, and extract the first features 513 and 514 and the second features 523 and 524. At least one of the first zones 511 and 512 and second zones 521 and 522 may be, for example, arbitrarily selected by the image processing module. The first features 513 and 514 or the second features 523 and 524 may include, for example, at least one of a shape of an edge of at least a part of an object, a motion thereof, a color thereof, a text thereof, or a position thereof, but various embodiments are not limited to this. Or, the image processing module may extract the first features 513 and 514 or the second features 523 and 524 by sequentially scanning the first image 510 or the second image 520.

According to one embodiment, the image processing module may extract the first features 513 and 514 or the second features 523 and 524 by various algorithms. For example, the image processing module may extract the features using a RANdom SAmple Consensus (RANSAC) algorithm or a split and merge algorithm. For example, the image processing module may extract the features using a Simultaneous Localization And Map building (SLAM) algorithm, based on a Kalman filter.

According to various embodiments, in instances in which the first image 510 is a zoomed-in image that is generated by cropping a first portion of a full frame, the image processing module may identify a third feature (not shown) from a second portion of the full image frame (e.g., the remainder of the full image frame). For example, the image processing module may extract the third feature from the remaining portion, independently from extracting the first features 513 and 514 from the first image 510, in parallel, or in order.

According to various embodiments, the image processing module may extract the first features 513 and 514 and the third feature from the full image frame. For example, the image processing module may extract the third feature from a specific zone arbitrarily selected among the entire image or the remaining portion. In another example, the image processing module may extract the third feature in a way of scanning the entire image or the remaining portion in order.

According to various embodiments, the image processing module may compare the first features 513 and 514 and the second features 523 and 524 with one another and determine if the first features 513 and 514 and the second features 523 and 524 match one another. For example, the image processing module may compare the first features 513 and 514 and the second features 523 and 524 by the unit of block in order.

According to one embodiment, the image processing module may determine if the first features 513 and 514 and the second features 523 and 524 match one another, based on a correlation between the first features 513 and 514 and the second features 523 and 524. For example, the image processing module may calculate the correlation using at least one equation (e.g., Equation 1) and, when the correlation is found to be within a specific range, the image processing module may determine that the first features 513 and 514 and the second features 523 and 524 match one another.

$$\rho = \frac{\text{Cov}(C, Y)}{\sqrt{\text{Var}(X)\text{Var}(Y)}} \quad (1)$$

Equation 1 represents one example of an equation for calculating the correlation of the first features 513 and 514 and the second features 523 and 524. Referring to Equation 1, the 'X' represents a first probability variable for the first features 513 and 514, and the 'Y' represents a second probability variable for the second features 523 and 524. The 'Cov(X, Y)' represents a covariance between the first probability variable and the second probability variable. The 'Var(X)' represents a first variance for the first probability variable, and the 'Var(Y)' represents a second variance for the first probability variable. The correlation (ρ) between the first features 513 and 514 and the second features 523 and 524 may be calculated by dividing the 'Cov(X, Y)' by a root value of a product of the 'Var(X)' and the 'Var(Y)'.

According to various embodiments, the image processing module may generate relation information indicating that the first image 510 and the second image 520 are related to one another, based on that the first features 513 and 514 and the second features 523 and 524 are similar with one another. For example, if the correlation between the first features 513 and 514 and the second features 523 and 524 is equal to or greater than a specific threshold, the image processing module may generate as the relation information a table associating identification information corresponding to the first image 510 with identification information corresponding to the second image 520. For example, through the table, the image processing module may associate a first photographing time, first photographing duration, first access information or first photographing environment information corresponding to the first image 510 with a second photographing time, second photographing duration, second access information or second photographing environment information corresponding to the second image 520.

Also, if determining that the first features 513 and 514 and the second features 523 and 524 do not match one another, the image processing module may not generate the relation information.

According to various embodiments, the image processing module may determine if arbitrary images are related to each other using relation information. For example, by extracting identification information corresponding to the first image 510 and the second image 520 from the relation information, the image processing module may determine that the first image 510 and the second image 520 are related to each other. As another example, if failing to extract the identification information about the first image 510 or the identification information about the second image 520 from the relation information, the image processing module may determine that the first image 510 and the second image 520 are not related to each other.

According to various embodiments, the image processing module may acquire the first image 510 or the second image 520 by using the relation information. For example, the image processing module may acquire the first image 510 or the second image 520, based on access information related to the first image 510 or second image 520 included in the relation information. For example, the image processing module may access a server corresponding to the access information to acquire the first image 510 or the second image 520. In another example, the image processing module may use a MAC address and a certificate of authentication included in the access information to form a security channel with an external electronic device storing the first image 510 or second image 520, and acquire the first image 510 or second image 520 through the corresponding security channel.

According to various embodiments, based on relation information, the image processing module may generate image data 530 including at least a part (e.g., the first features 513 and 514) of the first image 510 or at least a part (e.g., the second features 523 and 524) of the second image 520. For example, the image processing module may generate the image data by avoiding redundancies that exist between the first image 510 and the second image 520 in order to achieve more efficient memory usage. For example, because the first portion 513 of the first image matches the second portion 523 of the second image, the image processing module may include in the image data 530 only one of the first portion 513 and the second portion 523. By contrast, because the portion 514 of the first image does not match any portion of the second image, the portion 514 may be also included in the image data 530. Similarly, because the portion 524 does not match any portion of the first image, the portion 524 may as well be included in the image data 530.

Figure 6:
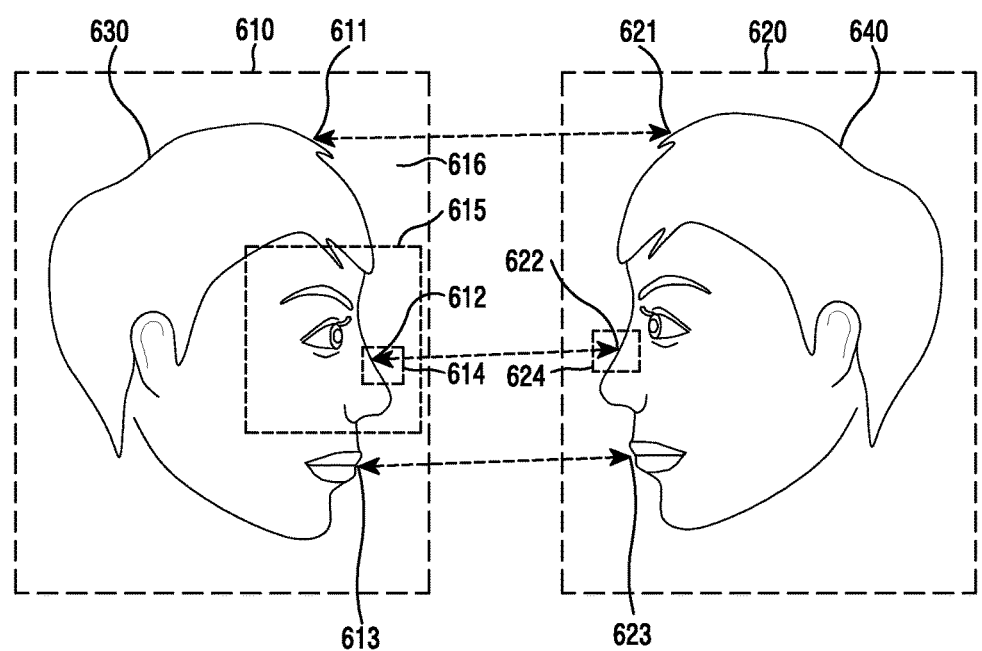
FIG. 6 is a diagram illustrating an example of a process for comparing images, according to various embodiments.

FIG. 6 is a diagram illustrating an example of a process for comparing images, according to various embodiments.

Referring to FIG. 6, the image processing module may compare a first image 610 and a second image 620 with each other. For ease of explanation, FIG. 6 illustrates an example in which the first image 610 is an image corresponding to a right surface 630 of the human face and the second image 620 is an image corresponding to a left surface 640 of the human face, but the first image 610 or the second image 620 may correspond to any surface of an object, and various embodiments are not limited to this.

According to various embodiments, the image processing module of the electronic device may extract a first feature and a second feature as feature points and compare the first feature and the second feature with each other. For example, the image processing module may extract first to third feature points 611, 612, and 613 from the first image 610 and extract fourth to sixth feature points 621, 622, and 623 from the second image 620, for comparison. In this case, the image processing module may determine that the first feature point 611 and the fourth feature point 621 match one another as a result of comparing the first feature point 611 and the fourth feature point 621. As illustrated in FIG. 6, the second feature point 612 and the fifth feature point 622, as well as the third feature point 613 and the sixth feature point 623, may also be found to match one another, respectively.

According to various embodiments, in instances in which a third image 615 is a zoomed-in image that is generated by extracting a portion of a full image frame, the image processing module may extract the first feature point 611 and the third feature point 613 from the remaining portion of the full image frame, for comparison with the fourth to sixth feature points 621, 622, and 623. In this case, the first feature point 611 and the third feature point 613 match the fourth feature point 621 and the sixth feature point 623 in a form of a corner and a color thereof, so the image processing module may determine that the first feature point 611 and the third feature point 613 match the fourth feature point 621 and the sixth feature point 623. For example, the image processing module may determine that the fourth to sixth feature points 621, 622, and 623 match a sum of the second feature point 612 of the third image 615 and the first feature point 611 and third feature point 613 of the remaining portion 616.

According to various embodiments, the image processing module may compare a first feature and a second feature by the unit of block. For example, the image processing module may use at least one of a macro block supported by H.264/MPEG-4 advanced video coding or H.265 or a coding tree unit or prediction unit supported by high-efficiency video coding, as a unit block which will perform a comparison operation. For example, the image processing module may extract the first feature point 612 from a first block 614 of the first image 610 and extract the second feature point 622 from a second block 624 of the second image 620, for comparison.

Figure 7:
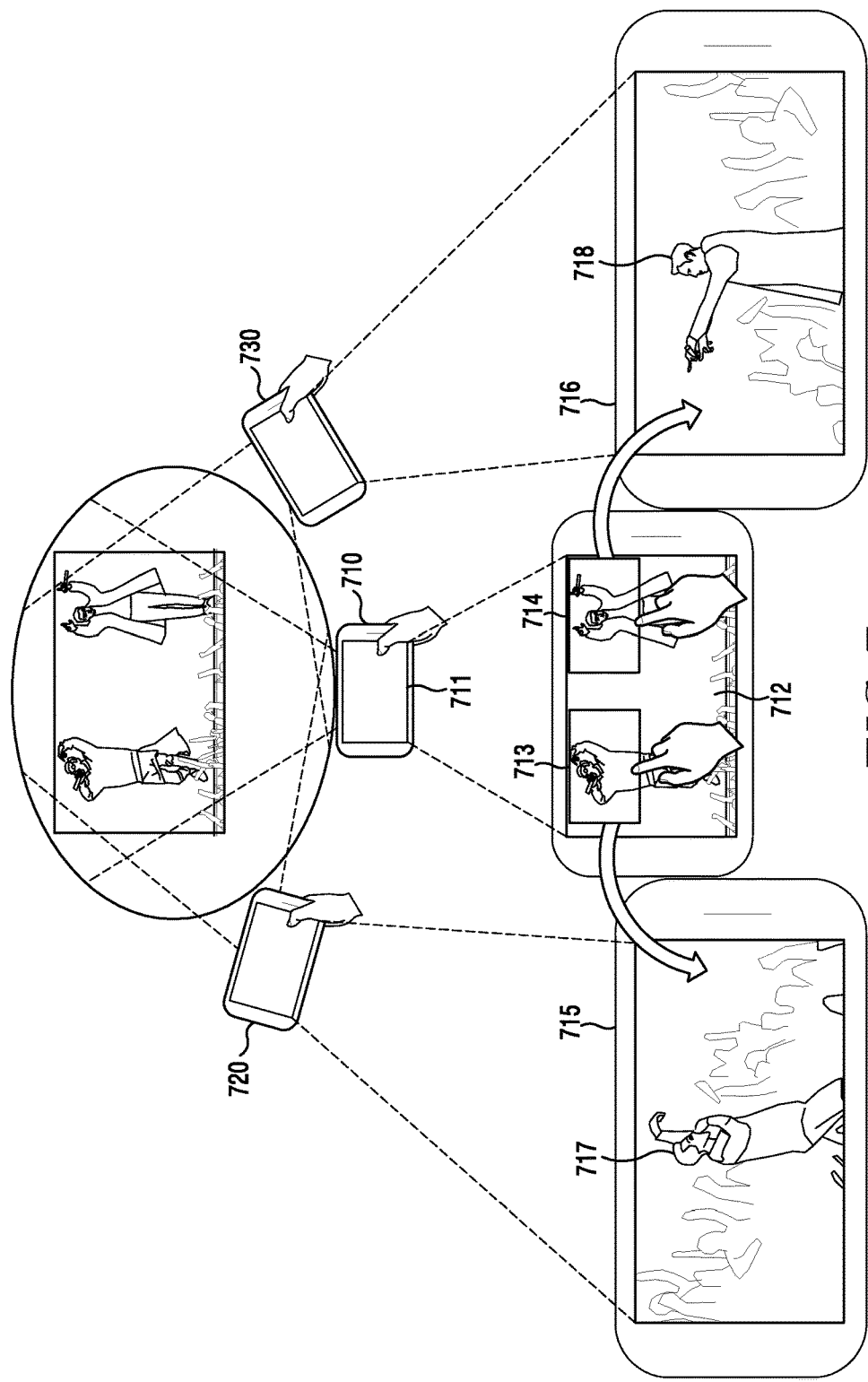
FIG. 7 is a diagram illustrating an example of a process for displaying connection guides, according to various embodiments.

FIG. 7 is a diagram illustrating an example of a process for displaying connection guides, according to various embodiments.

Referring to FIG. 7, the electronic device 710 may include a display 711 that is part of the electronic device 710 and an image processing module (e.g., the image processing module 180) implemented by a processor. In operation, as discussed below, the electronic device 710 may display an image and one or more connection guides associated with the image. Each of the connection guides may include a user interface component which when activated causes another image to be displayed that is related to the image currently on display.

According to various embodiments, the electronic device 710 may acquire relation information about a first image 712 and a second image 715 (e.g., an image photographed through a second electronic device 720) and third image 716 (e.g., an image photographed through a third electronic device 730) related to the first image 712. The relation information about a specific image (e.g., the second image 715) may be any suitable type of information that indicates that the specific image (e.g., the second image 715) and other images (e.g., the first image 712 and the third image 716) are related to one another. The electronic device 710 may extract specific information items related to the first image 712, the second image 715, or the third image 716 from the relation information. For example, the electronic device 710 may extract, from the relation information, access information for connecting the second image 715 or the third image 716 to the first image 712. The electronic device 710 may use the access information to retrieve the second image 715 or the third image 716 while the first image 712 is being displayed.

According to various embodiments, the electronic device 710 may display a first connection guide 713 for the second image 715 and/or a second connection guide 714 for the third image 716 such that the first connection guide 713 or the second connection guide 714 is superimposed on at least a part of the first image 712. For example, the electronic device 710 may display the first connection guide 713 in relation with at least one object commonly included in the first image 712 and the second image 715. In another example, the electronic device 710 may display the second connection guide 714 in relation with at least one object commonly included in the first image 712 and the third image 716. The first connection guide 713 and the second connection guide 714 may, for example, include a graphical representation of a box or circle, a graphic user interface, or a text, etc.

According to one embodiment, the electronic device 710 may display a connection guide for a particular image such that the connection guide surrounds an object that is depicted in both the first image and the particular image. For example, the electronic device 710 may display the first connection guide 713 such that the first connection guide 713 surrounds a first object 717 commonly focused in the first image 712 and the second image 715. For example, the electronic device 710 may display the first connection guide 713 in a form of a thumbnail window overlapped with the first image 712. In another example, the electronic device 710 may display the second connection guide 714 such that the second connection guide 714 surrounds a second object 718 focused in the first image 712 and the third image 716. For example, in instances in which the first object 717 and the second object 718 are located at the same or close distance, the electronic device 710 may at least partially overlap the first connection guide 713 and the second connection guide 714.

According to various embodiments, the electronic device 710 may set a size of a connection guide, based on a size of a focused zone. For example, the electronic device 710 may display the first connection guide 713 in a larger size than the second connection guide 714, based on a focus zone of the first object 717 in the second image 715 (e.g., portion of the second image 715 that is occupied by the first object 717) being bigger than a focus zone of the second object 718 in the third image 716 (e.g., portion of the second object that is occupied by the second object 718). In another example, the electronic device 710 may display the first connection guide 713 in a smaller size than the second connection guide 714, based on a focus zone of the first object 717 in the second image 715 being smaller than a focus zone of the second object 718 in the third image 716.

According to various embodiments, the electronic device 710 may display a connection guide such that the connection guide surrounds at least one object determined to be depicted in multiple images. For example, in response to detecting that a first object outputted within the first image 712 and the first object 717 within the second image 715 match one another, the electronic device 710 may display the first connection guide 713 such that the first connection guide 713 surrounds the first object within the first image 712. For example, the electronic device 710 may calculate a correlation between a first feature and a second feature and, if the calculated correlation is equal to or is greater than a specific numerical value, the electronic device 710 may display the first connection guide 713 such that the first connection guide 713 surrounds the first object. For instance, the electronic device 710 may superimpose the first connection guide 713 onto the first image 712. Also, if a second object outputted within the first image 712 and the second object 718 within the third image 716 match each other, the electronic device 710 may display the second connection guide 714 such that the second connection guide 714 surrounds at least a part of the second object within the first image 712. For example, if the first object and the second object are at the same or close distance, the electronic device 710 may at least partially superimpose the first connection guide 713 onto the second connection guide 714.

According to various embodiments, the electronic device 710 may display relation information associated with a connection guide. For example, the electronic device 710 may display relation information corresponding to the second image 715 adjacently to the first connection guide 713 corresponding to the second image 715. For instance, the electronic device 710 may display the first connection guide 713 in a form of a thumbnail window, and display the relation information about the second image 715 adjacently to one edge of the thumbnail window. In another example, the electronic device 710 may display relation information associated with the third image 716 adjacently to the second connection guide 714 that corresponds to the third image 716.

According to various embodiments, the electronic device 710 may display relation information associated with at least one object that is depicted in multiple images. For example, the electronic device 710 may display relation information about the second image 715 around a first object that is depicted in the first image 712 and the second image 715. In another example, the electronic device 710 may display relation information associated with the third image 716 around a second object depicted in the first image 712 and the third image 716.

According to various embodiments, in response to detecting that relation information associated with the second image 715 matches relation information associated with the third image 716, the electronic device 710 may highlight and display only the relation information associated with the second image 715 or the third image 716. For example, the electronic device 710 may display only the relation information associated with one of the second image 715 or the third image 716, compared with other relation information about the remaining portion excepting the second image 715 or the third image 716. In another example, the electronic device 710 may display the relation information associated with one of the second image 715 or the third image 716 in a first color, and display the other relation information about the remaining portion excepting the second image 715 or the third image 716 by a text of a second color.

According to various embodiments, the electronic device 710 may display an image in response to an input related to a connection guide. For example, the electronic device 710 may display the second image 715 in response to an input (e.g. a touch input to a zone in which the first connection guide 715 is displayed) to the first connection guide 713. Additionally or alternatively, the electronic device 710 may display the third image 716 in response to an input to the second connection guide 714 related to the third image 716.

According to various embodiments, in response to a touch input, the electronic device 710 may display the second image 715 or the third image 716 on the entire display 711 or a part thereof. According to one embodiment, to display the second image 715 or the third image 716 on the entire display 711, the electronic device 710 may hide the first image 712. Additionally or alternatively, the electronic device 710 may partially display the second image 715 or the third image 716 within the first image 712 in a picture-in-picture format. For instance, in response to an input to the first image 712, the electronic device 710 may display the second image 715 or the third image 716 in a picture-in-picture format.

According to various embodiments, the electronic device 710 may display a preview image (not shown) of the second image 715 or the third image 716 in a picture-in-picture format. In such instances, the electronic device 710 may display the second image 715 or the third image 716 on the entire screen in response to an input to the preview image. For example, the electronic device 710 may display the first image 712 in a picture-in-picture format while displaying the second image 715 or the third image 716 on the entire screen. For example, the electronic device 710 may concurrently display the second image 715 and the third image 716 in a multi-window form. In this case, the electronic device 710 may display a multi-window for the second image 715 and the third image 716 on the entire screen. In another example, the electronic device 710 may display the second image 715 at one side (e.g., the left side) of the screen, and split the other side (e.g., the right side) of the screen to display the third image 716 and at least one other image. In such instances, the third image 716 and other images may be displayed in a preview image form or may be displayed as the original images.

According to various embodiments, in response to an input, the electronic device 710 may highlight an image corresponding to the input, in order to distinguish that image from other images not corresponding to the input. For example, the electronic device 710 may highlight and display the second image 715 while that image is displayed concurrently with the image 716 in a picture-in-picture format. For example, the electronic device 710 may highlight and display a first preview image corresponding to receive input while at least one other preview image is displayed.

For example, the electronic device 710 may display the first preview image in a larger size than the second preview image. For example, the electronic device 710 may enlarge the first preview image in response to the input while continuing to display the second preview image at the same size. In another example, the electronic device 710 may reduce the size of the second preview image.

For example, the electronic device 710 may display the first preview image and the second preview image such that the first preview image is surrounded with a thicker edge than the second preview image. For example, in response to an input, the electronic device 710 may cause an edge of the first preview image to become thicker than an edge of the second preview image. In another example, in a state of displaying to surround the first preview image and the second preview image with an edge of the same thickness, in response to an input, the electronic device 710 may cause the edge of the first preview image to become thicker than the edge of the second preview image. In another example, the electronic device 710 may cause the edge of the second preview image to become thinner than the edge of the first preview image.

According to various embodiments, in response to an input to one connection guide, the electronic device 710 may concurrently display three or more multiple images related to an object included in the connection guide. For example, in response to a touch input to a connection guide, the electronic device 710 may display multiple images of the object that are captured from different vantage points. For instance, the electronic device 710 may concurrently display multiple images or preview images of those images in a picture-in-picture format. For example, in response to detecting an input at a given preview image, the electronic device 710 may display a full-sized image corresponding to that preview image.

According to various embodiments, the electronic device 710 may display multiple images based on the vantage points from which the images are photographed. For example, the electronic device 710 may arrange the multiple images in a picture-in-picture form, based on respective vantage points associated with the images that are identified based on relation information associated with the images. For example, the electronic device 710 may display the second image 715 or a preview image of the second image 715 at the left side on a basis of a central part of the first image 712, based on a determination that a point of the second image 715 is to the left side of a vantage point of the first image 712. For instance, the electronic device 710 may display the third image 716 or a preview image of the third image 716 at the right side of a central part of the first image 712, based on a determination that a vantage point of the third image 716 is located to the left of a vantage point of the first image 712. The electronic device 710 may concurrently arrange preview images of the second image 715 and the third image 716 on different sides of a central part of the first image 712. The electronic device 710 may superimpose at least a part of the second image 715 onto the third image 716.

Figure 8:
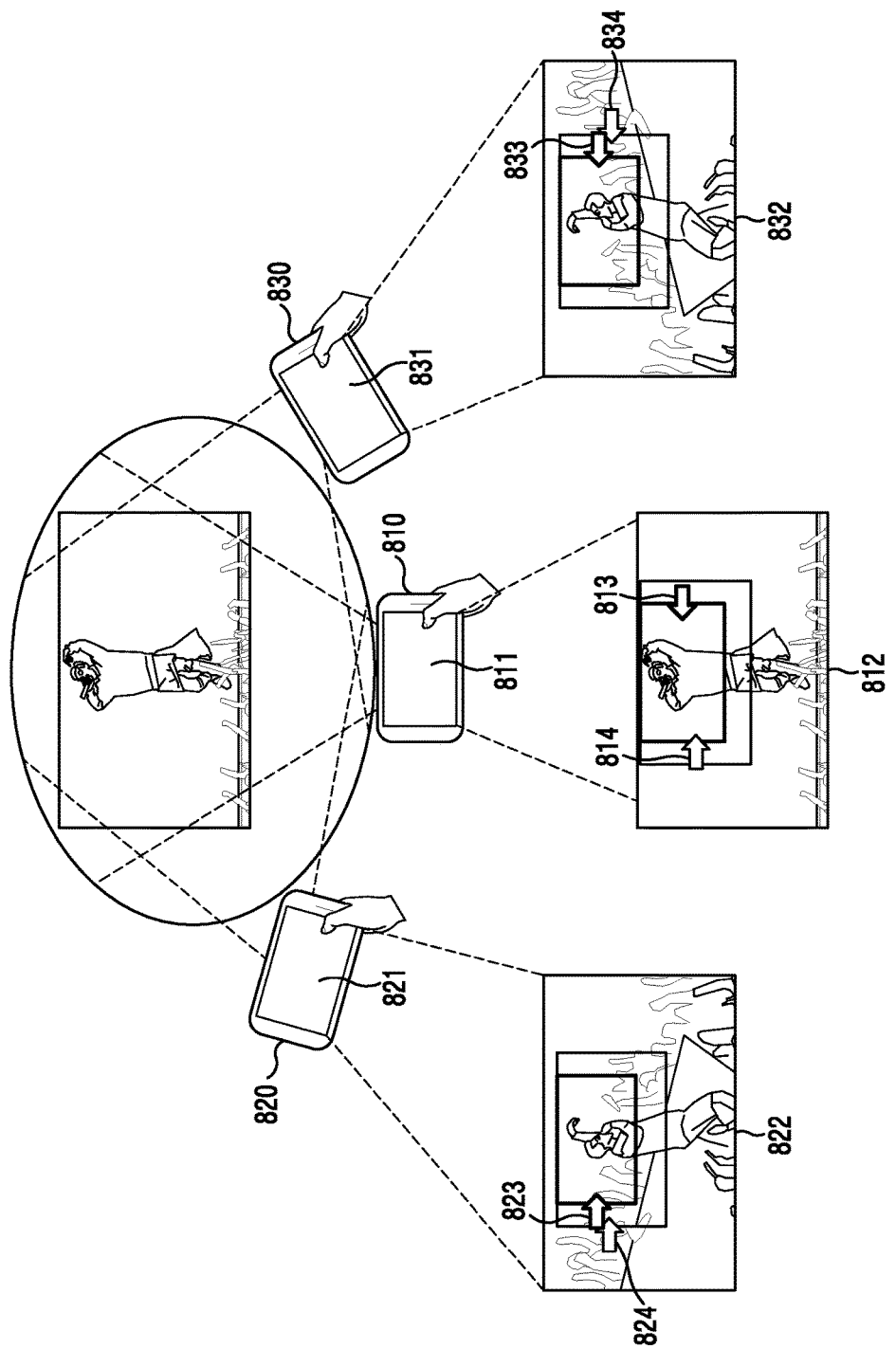
FIG. 8 is a diagram illustrating an example of a process for displaying connection guides, according to various embodiments.

FIG. 8 is a diagram illustrating an example of a process for displaying connection guides, according to various embodiments.

Referring to FIG. 8, for example, the electronic devices 810, 820, and 830 may display images 812, 822, and 832 and connection guides 813, 814, 823, 824, 833, and 834 through displays 811, 821, and 831 operatively connected to the electronic devices 810, 820, and 830. The first image 812 may be, for example, an image photographed by the electronic device 810. The second image 822 may be, for example, an image photographed by the first external electronic device 820. The third image 832 may be, for example, an image photographed by the second external electronic device 830. The connection guide may include the first connection guide 813 for the second image 822 and the second connection guide 814 for the third image 832. For example, the electronic devices 810, 820, and 830 may include an image processing module, such as the image processing module 180.

According to various embodiments, the electronic device 810 may display the first connection guide 813 or the second connection guide 814, based on a result of comparing the respective vantage points of the first image 812, the second image 822, and the third image 832. For example, the electronic device 810 may display the first connection guide 813 for the second image 822, based on a determination that the second image 822 has been photographed at the left side compared to the first image 812. For instance, the electronic device 810 may superimpose onto the first image 812, a figure (e.g., an arrow or triangle) directing to the left as the first connection guide 813. The electronic device 810 may display the figure directing to the left at the right side of a central part of the first image 812, but may display the figure directing to the left at an edge of the left side, and other embodiments are possible as well.

According to various embodiments, the electronic device 810 may display a guide which adds a thumbnail window to the figure directing to the left as the first connection guide 813. For example, the electronic device 810 may additionally display the thumbnail window surrounding an object depicted in both the first image 812 and the second image 822. The electronic device 810 may display at least a part of the figure directing to the left and at least a part of the thumbnail window.

For example, the electronic device 810 may display the second connection guide 814 for the third image 832 in relation with the first connection guide 813. For example, the electronic device 810 may display a figure directing to the right as the second connection guide 814 and a thumbnail window in addition to the first connection guide 813. For example, the electronic device 810 may overlap and display the first connection guide 813 and the second connection guide 814. For instance, if objects depicted in the second image 822 and the third image 832 match one another, the electronic device 810 may display a thumbnail window of the first connection guide 813 and a thumbnail window of the second connection guide 814 as one combined thumbnail window. For example, the electronic device 810 may overlap a left corner of the one combined thumbnail window and the figure directing to the right while also overlapping a right corner of the one combined thumbnail window and the FIG. directing to the left.

According to various embodiments, based on a first image, a second image, or relation information about the first image and the second image, the electronic device 810 may display information related to the vantage points (or viewing directions) from which the first image and the second image are photographed. For example, the electronic device 810 may display a calculated photographing angle, vantage point, or photographing distance through the display 811. For example, the electronic device 810 may display vantage points of a first device (e.g., the first external electronic device 820) and a second device (e.g., the second external electronic device 830), photographing angles, or a distance between the first device and the second device, in relation with the first image and the second image.

For example, in instances in which a guide related to the first image or second image is displayed on an arbitrary image, the electronic device 810 may display at least one text or graphic user interface representing a photographing angle of the first image or second image for an object, a vantage point thereof, or a photographing distance thereof around the guide. In another example, the electronic device 810 may display the photographing angle of the first image or second image, the vantage point thereof, or the photographing distance thereof in a form of a list. For example, in instances in which the object and the guide related to the first image or second image are displayed on an arbitrary image, the electronic device 810 may display an angle between the direction from which the first image is photographed and the direction from which the second image is photographed, around the object. In another example, the electronic device 810 may display a distance between a vantage point of the first image and a vantage point of the second image.

According to various embodiments, in instances in which there is a plurality of images photographed from one direction, the electronic device 810 may display multiple connection guides for the multiple images in relation with each other. For example, in instances in which there are the first image 812 and the third image 832 photographed at the right side compared to the second image 822, the first external electronic device 820 may display the third connection guide 823 for the first image 812 or the fourth connection guide 824 for the third image 832 in relation with each other. For example, the first external electronic device 820 may overlap or merge parts of the third connection guide 823 and the fourth connection guide 824, for displaying. For example, the first external electronic device 820 may overlap the third connection guide 823 and the fourth connection guide 824 or merge the third connection guide 823 and the fourth connection guide 824 into one figure (e.g., thick arrow, triangle). For example, in response to an input to the overlapped or merged connection guide, the first external electronic device 820 may display preview images of the first image 812 and the third image 832 within the second image 822 in a picture-in-picture format. In another 5 example, in response to an input to the overlapped or merged connection guide, the first external electronic device 820 may display an image (e.g., the first image 812) photographed in a position closer than a vantage point of the second image 822, among the first image 812 or the third image 832. In this case, the first external electronic device 820 may display a preview image of an image (e.g., the third image 832) photographed in a further position within an image (e.g., the first image 812) photographed in a closer position in a picture-in-picture form.

For example, alike even in instances in which there are the first image 812 and the second image 822 photographed at the left side compared to the third image 832, the second external electronic device 830 may display the fifth connection guide 833 for the first image 812 or the sixth connection guide 834 for the second image 822. For example, the second external electronic device 830 may overlap or merge the fifth connection guide 833 and the sixth connection guide 834.

According to various embodiments, the electronic device 810 may display the first connection guide 813 at an edge portion of the first image 812 by a graphic user interface. For example, the electronic device 810 may display the graphic user interface at a left edge of the first image 812, based on a determination that the second image 822 has been captured from a vantage point that is located to the left of the vantage point of the first image 812. For instance, the electronic device 810 may display the graphic user interface of a figure or photographing device form in a central part of a left edge of the first image 812.

According to various embodiments, the electronic device 810 may display the first connection guide 813 and the second connection guide 814 by a graphic user interface, based on relative vantage points of the second image 822 and the third image 832. For example, the electronic device 810 may display a guide for an image photographed in a position closer to an object among the second image and the third image, at an upper side of the first image 812 than a guide for an image photographed in a further position.

Figure 9:
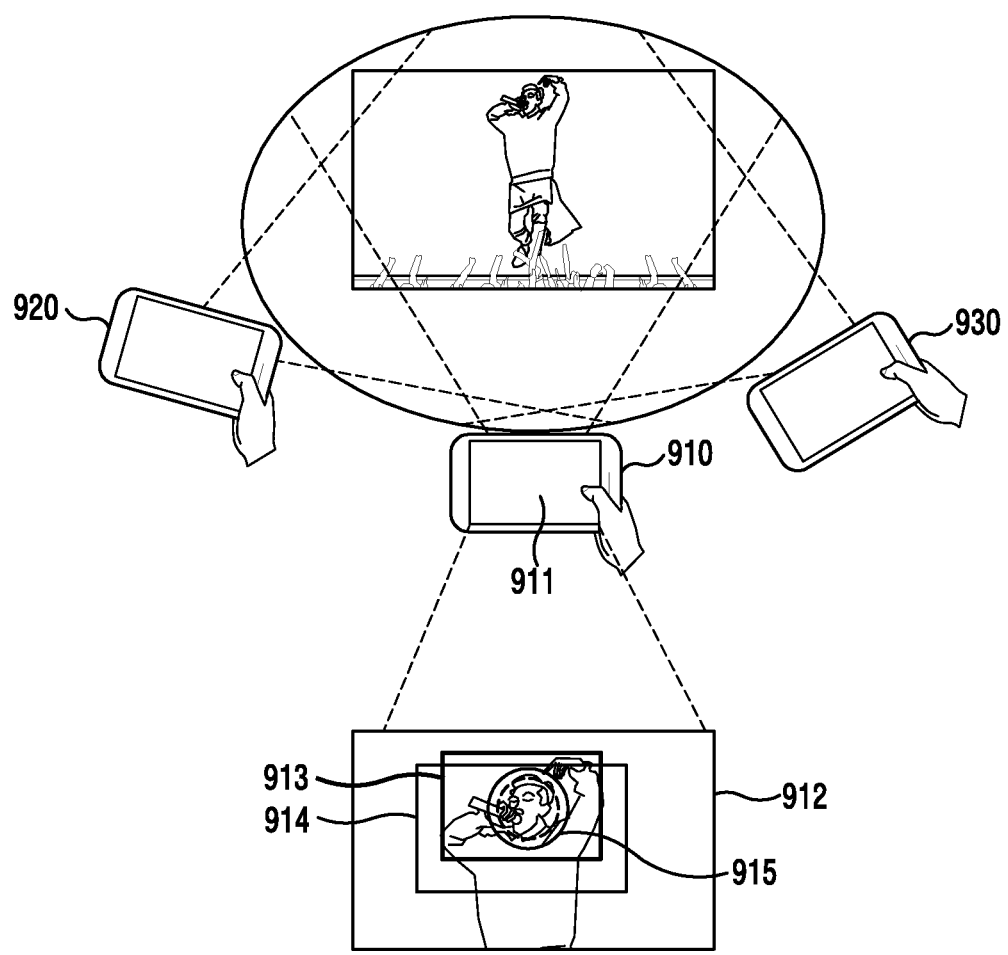
FIG. 9 is a diagram illustrating an example of a process for displaying connection guides, according to various embodiments.

FIG. 9 is a diagram illustrating an example of a process for displaying connection guides, according to various embodiments.

Referring to FIG. 9, for example, the electronic device 910 may display a first image 912 and connection guides 913, 914, and 915 on a display 911 that is part of the electronic device 910. For example, the first image 912 may be an image photographed by the electronic device 910, a second image (not shown) may be an image photographed by a first external electronic device 920, and a third image (not shown) may be an image photographed by a second external electronic device 930. For example, the electronic device 910 may include an image processing module (e.g., the image processing module 180).

According to various embodiments, the electronic device 910 may display the photographing guide 915 for an object which is depicted in both in the first image 912 and the second image (not shown), onto the first image 912. For example, the electronic device 910 may display at least one figure as the photographing guide 915, such that the at least one figure is overlapped with the object within the first image 912. For instance, the electronic device 910 may display each of the first connection guide 913 for the second image and the second connection guide 914 for the third image in a thumbnail window form, respectively, and display the photographing guide 915 within the first connection guide 913 and the second connection guide 914.

According to various embodiments, in response to an input to the photographing guide 915, the electronic device 910 may photograph at least one object related to the photographing guide 915. For example, in response to an input to the photographing guide 915 displayed on the first image 912, the electronic device 910 may photograph the object which is depicted in the second image or the third image. In this case, the electronic device 910 may photograph the object from a different viewing direction than the first external electronic device 920 or the second external electronic device 930.

According to various embodiments, in response to an input to the photographing guide 915, the electronic device 910 may zoom in and photograph at least one object related to the photographing guide 915. For example, in response to an input to the photographing guide 915 displayed on the first image 912, the electronic device 910 may zoom in and photograph an object depicted in both the second image and the third image. In this case, the electronic device 910 may zoom-in on the object and/or photograph the image from a different viewing direction than the external electronic device 920 or the second external electronic device 930.

According to various embodiments, the electronic device 910 may transmit information for focusing or zooming in and photographing an object having been focused and photographed in the second image or third image, to the first and second external electronic devices 920 and 930. For example, when photographing the object having been focused and photographed in the second image or the third image, the electronic device 910 may transmit information for focusing or zooming in and photographing the object to the first and second external electronic devices 920 and 930. In this case, the first and second external electronic devices 920 and 930 may focus or zoom-in and photograph the object from viewing directions that are different from that of the electronic device 910.

Figure 10:
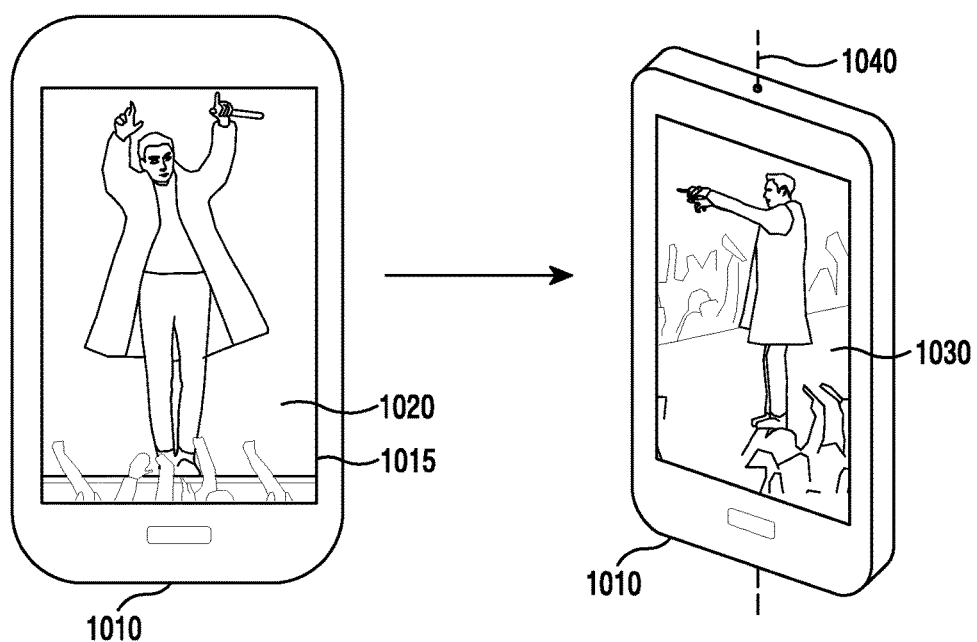
FIG. 10 is a diagram illustrating an example of a process for displaying images, according to various embodiments.

FIG. 10 is a diagram illustrating an example of a process for displaying images, according to various embodiments.

Referring to FIG. 10, for example, the electronic device 1010 may display a first image 1020 or a second image 1030 on a display 1015 that is part of the electronic device 1010. For example, the first image 1020 may be an image captured by the electronic device 1010, and the second image 1030 may be an image captured by an external electronic device (not shown). For example, the electronic device 1010 may include an image processing module (e.g., the image processing module 180).

According to various embodiments, the electronic device 1010 may display the first image 1020 or the second image 1030, based on the movement direction or rotation direction of the electronic device 1010. For example, the electronic device 1010 may display the second image 1030, based on the electronic device moving (or being oriented towards) the vantage point from which the second image 1030 is captured. For example, the electronic device 1010 may sense that the electronic device 1010 moves in a specific direction (e.g., to the right) on a basis of a central axis 1040, and may display the second image 1030 when the electronic device moves towards the vantage point from which the second image 1030 is captured. In another example, when sensing that the electronic device 1010 moves away from the vantage point from which the second image is captured, the electronic device 1010 may not display the second image 1030. In this case, the electronic device 1010 may search another image to be displayed, without displaying the second image 1030.

According to various embodiments, the electronic device 1010 may display a list (not shown) of multiple images, based on the movement direction of the electronic device 1010. For example, the electronic device 1010 may sense that the electronic device 1010 moves in a specific direction and display the list of multiple images which are photographed in the specific direction of the electronic device 1010. The electronic device 1010 may display the list of multiple images at an edge of one side of the first image 1020 or a central part thereof.

According to various embodiments, the electronic device 1010 may display multiple images in a picture-in-picture form (not shown), based on the movement direction of the electronic device 1010. For example, the electronic device 1010 may sense that the electronic device 1010 moves in a specific direction and display to overlap the multiple images photographed in the specific direction of the electronic device 1010 with the first image 1020 in the picture-in-picture form. For instance, the electronic device 1010 may display the multiple images in different positions within the first image 1020 in the picture-in-picture format, respectively, based on the vantage points from which the multiple images are captured.

Figure 11:
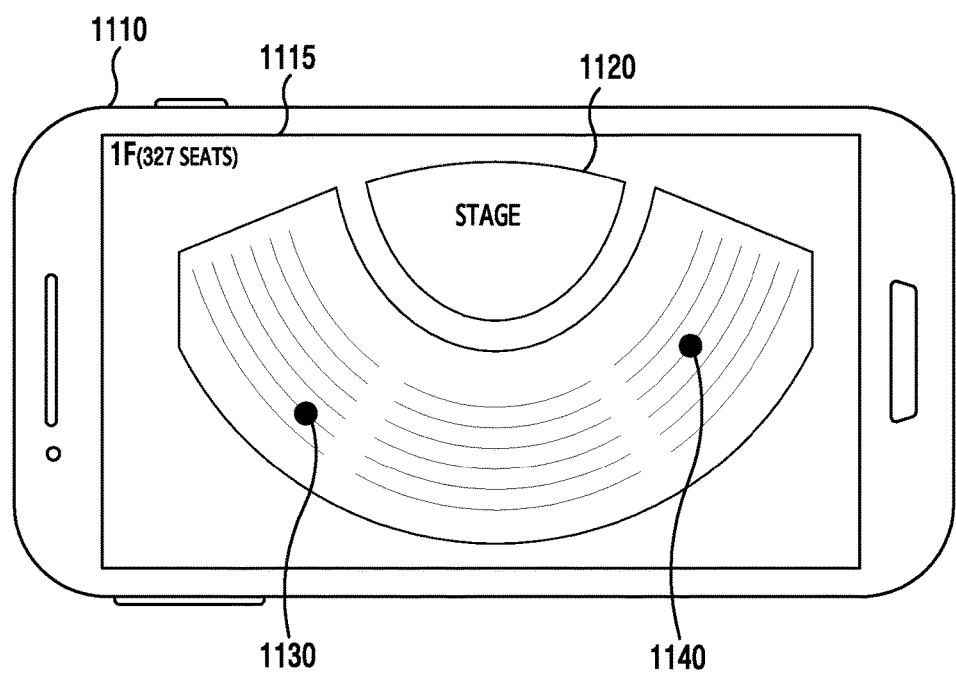
FIG. 11 is a diagram of an example of an image selection menu, according to various embodiments.

FIG. 11 is a diagram of an example of an image selection menu, according to various embodiments.

Referring to FIG. 11, for example, the electronic device 1110 may display a menu 1120 related to multiple images, through a display 1115 that is part of the electronic device 1110. The electronic device 1110 may, for example, include an image processing module (e.g., the image processing module 180).

According to various embodiments, the image processing module may display a menu 1120 for displaying different images based on a photographing place where the images are captured. For example, the image processing module may display a graphical user interface (e.g., a figure, a seat shape) for each of the multiple images on the menu 1120 on a representation of the photographing place (e.g., a theater or a stadium). For instance, the electronic device 1110 may display in the graphic user interface an indication of vantage point (e.g., a seat and a zone) from which an image is captured. For instance, the electronic device 1110 may indicate on the user interface the respective vantage point of each of the images.

According to various embodiments, the electronic device 1110 may display an image connected to a graphic user interface, in response to an input to the graphic user interface on the menu 1120. For example, the electronic device 1110 may display images connected to graphic user interfaces 1130 and 1140, in response to an input to the graphic user interfaces 1130 and 1140 which are displayed based on a vantage point of each image. For example, the electronic device 1110 may display an image in a picture-in-picture form such that the image is overlapped with the menu 1120. In another example, the electronic device 1110 may display the image on the entire display 1115.

According to various embodiments, an electronic device (e.g., the electronic device 101) processing multiple images may include a memory for storing an image, and an image processing module (e.g., the image processing module 180) operatively connected with the memory.

According to various embodiments, the image processing module may acquire a first image and a second image from an electronic device or an external device for the electronic device.

According to various embodiments, the image processing module may check a first feature from the first image, and a second feature from the second image.

According to various embodiments, the image processing module may generate relation information (e.g., identification information about the image, access information for accessing the image, or photographing environment information) representing that the first image and the second image are related to each other, based on that the first feature and the second feature are match each other.

According to various embodiments, the image processing module may generate image data including at least a part of the first image or at least a part of the second image, based on the relation information.

According to various embodiments, the first feature or the second feature may include at least one of a form of an edge of at least a part of an external object of the electronic device, a motion thereof, a color thereof, a text thereof, or a position thereof.

According to various embodiments, the relation information may include at least one of identification information about the first image and the second image, a photographing time, a photographing duration, access information, photographing environment information, or information related to an object commonly included in the first image and the second image.

According to various embodiments, the image processing module may digitize a correlation of the first feature and the second feature, and determine that the first feature and the second feature are match each other, based on that the digitized correlation corresponds to a specific range.

According to various embodiments, the first image may be an image corresponding to a first view on an external object of the electronic device, and the second image may be an image corresponding to a second view on the external object.

According to various embodiments, the image processing module may acquire at least one of an angle between the first view and the second view, a distance between a position of the external object and a photographing position of the first image, or a distance between the external object and a photographing position of the second image.

According to various embodiments, the first image may be acquired through the electronic device, and the second image may be an image photographed through an external device for the electronic device.

According to various embodiments, the image processing module may use at least one portion commonly included in first image data about the first image and second image data about the second image, to compress the first image data and the second image data into image data.

According to various embodiments, the image processing module may, if the first image is a zoomed-in image, acquire the remaining portion excepting the first image among the entire image sensed through a camera module operatively connected with the electronic device.

According to various embodiments, the image processing module may check a third feature from the remaining portion, and generate relation information related to the second image and the remaining portion, based on that the second feature and the third feature match each other.

According to various embodiments, the image processing module may generate the image data, based on synchronization information for matching the first image and the second image on a basis of the same time.

According to various embodiments, the image processing module may transmit at least one of the image data or the relation information, to at least one external device for the electronic device.

According to various embodiments, the image processing module may transmit at least one of the image data or the relation information to the external device for the electronic device, by periods or in response to a specific event.

According to various embodiments, the image processing module may insert at least a part of the relation information into at least one of a header of the image data, supplemental enhancement information (SEI) thereof, video usability information (VUI) thereof, or metadata thereof.

According to various embodiments, an electronic device (e.g., the electronic device 101) for processing multiple images may include a display operatively connected with the electronic device, and an image processing module implemented by a processor.

According to various embodiments, the image processing module may acquire relation information about a first image, and a second image related to the first image, from the electronic device or an external device for the electronic device.

According to various embodiments, the image processing module may use the relation information to display a connection guide for the second image through the display such that the connection guide for the second image is overlapped with at least a part of the first image.

According to various embodiments, the image processing module may display the second image in response to at least one input related to the connection guide.

According to various embodiments, the connection guide may include at least one of a thumbnail window of a box or circle form, a graphic user interface, or a text.

According to various embodiments, the image processing module may acquire other relation information about a third image related to the first image, and use the other relation information to display other connection guide for the third image through the display such that the other connection guide for the third image is overlapped with at least a part of the first image.

According to various embodiments, the image processing module may determine display positions of the connection guide and the other connection guide, based on a first photographing position of the second image and a second photographing position of the third image.

According to various embodiments, the image processing module may display a photographing guide for at least one object included in a zone in which the connection guide and the other connection guide are overlapped with each other and, in response to at least one input to the photographing guide, focus and photograph the at least one object through a camera module operatively connected with the electronic device.

According to various embodiments, the image processing module may include display at least a part of the relation information, in relation with the connection guide.

According to various embodiments, the image processing module may sense the movement direction of the electronic device, and display the second image, based on a determination that the second image is an image photographed from a position being on the movement direction with respect to the electronic device.

According to various embodiments, the image processing module may associate the first image with a first view on at least one object commonly included in the first image and the second image, and associate the second image with a second view on the at least one object.

According to various embodiments, the image processing module may display at least one of a relative angle of the first view and the second view, a distance between a position of the external object and a photographing position of the first image, or a distance between a position of the external object and a photographing position of the second image, through a display operatively connected with the electronic device.

Figure 12:
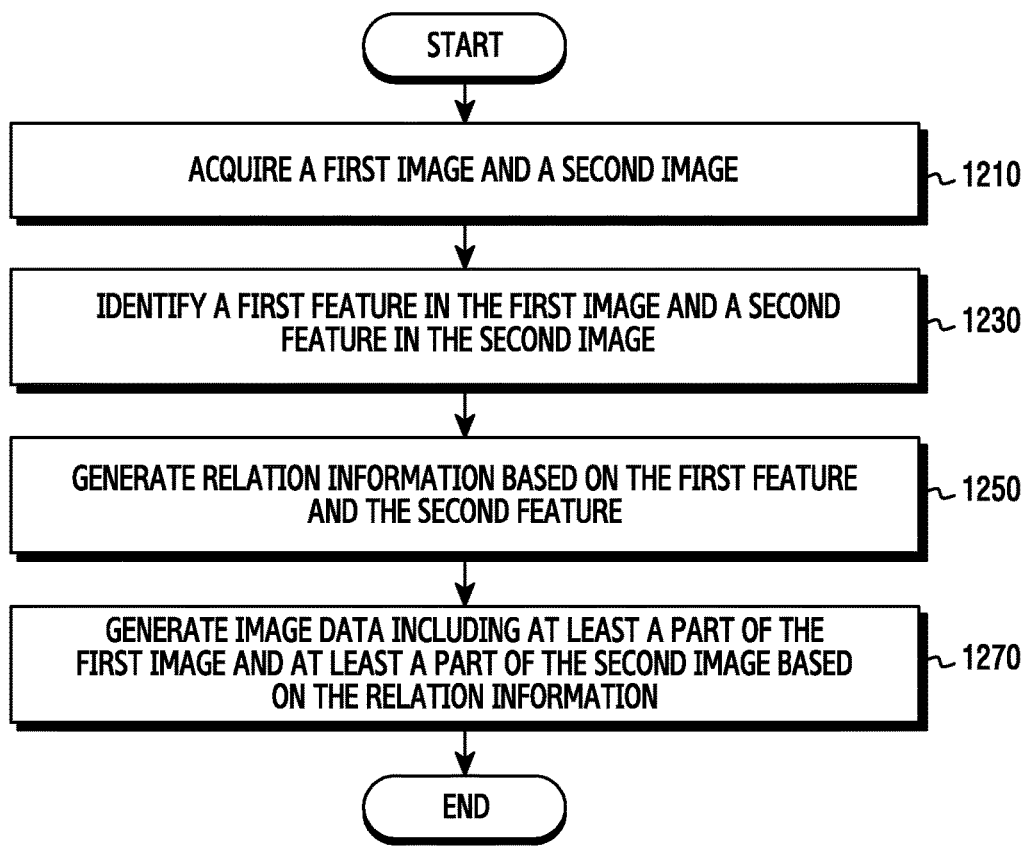
FIG. 12 is a flowchart of an example of a process, according to various embodiments.

FIG. 12 is a flowchart of an example of a process, according to various embodiments.

Referring to FIG. 12, in operation 1210, the electronic device (e.g., the camera module 291 or the communication module 220) may acquire a first image and a second image. According to various embodiments, the electronic device may acquire the first image by photographing an external object of the electronic device, and receive the second image from an external electronic device (e.g., the electronic device 102).

In operation 1230, the electronic device (e.g., the image processing module 180) may identify a first feature from a first zone within the first image, and a second feature from a second zone within the second image. According to various embodiments, the electronic device may extract at least one of a form of an edge of at least a part of an object included in the first image or second image, a motion thereof, a color thereof, a text thereof, or a position thereof. For example, the electronic device may store the first feature or the second feature in a memory (e.g., the memory 130 and the memory 230).

In operation 1250, the electronic device (e.g., the image processing module 180) may generate relation information related to the first image and the second image in response to detecting that the second feature matches the second feature. According to various embodiments, the electronic device may determine if the first feature and the second feature match one another by calculating a correlation of the first feature and the second feature, and determining if the correlation is equal to or is greater than a specific threshold. For instance, the electronic device may generate relation information representing that the first image and the second image are related to each other, based on determination that the correlation is equal to or is greater than the threshold.

According to one embodiment, the electronic device (e.g., the image processing module 180) may store in the relation information an indication of a vantage point (and/or viewing direction) from which the first image is captured and/or an indication of a vantage point (and/or viewing direction) from which the second image is captured. Put differently, the relation information may include any suitable type of indication that the first image depicts a first view of the object while the second image depicts a second view of the object that is different from the first view. More particularly, the electronic device may store an indication that that the first image depicts a first view of the object (e.g., a distance between the object and a vantage position of the first image, and a photographing angle about the front of the object), in data (e.g., a header, replenishment reinforcement information, and metadata) related to the first image. Also, the electronic device may store an indication that the second image may represent a second view of the object, in data related to the second image.

In operation 1270, the electronic device (e.g., the image processing module 180) may use the relation information to generate image data including at least a part of the first image or at least a part of the second image. According to various embodiments, the electronic device may insert at least a part of the first image at least a part of the second image into the image data. For example, the electronic device may compress the first image and the second image into image data by a coding technique (e.g., Multiview video coding). The image data may be data that encodes the first image or the second image.

According to various embodiments, a method processing multiple images may include the operations of acquiring a first image and a second image in an electronic device, checking a first feature from the first image, and a second feature from the second image, generating relation information representing that the first image and the second image are related to each other, based on that the first feature and the second feature match one another, and generating image data including at least a part of the first image or at least a part of the second image, based on the relation information.

According to various embodiments, the checking operation may include the operation of acquiring as the first feature or the second feature at least one of a form of an edge of at least a part of an external object of the electronic device, a motion thereof, a color thereof, a text thereof, or a position thereof.

According to various embodiments, the operation of generating the relation information may include the operation of generating as at least a part of the relation information at least one of identification information about the first image and the second image, a photographing time, a photographing duration, access information, photographing environment information, or information related to an object commonly included in the first image and the second image.

According to various embodiments, the operation of generating the relation information may include the operation of digitizing a correlation between the first feature and the second feature, and determining that the first feature and the second feature match one another, based on that the digitized correlation corresponds to a specific range.

According to various embodiments, the operation of generating the relation information may include the operation of associating the first image with an image corresponding to a first view on an external object of the electronic device, and associating the second image with an image corresponding to a second view of the external object.

According to various embodiments, the operation of generating the relation information may include the operation of acquiring at least one of an angle between the first view and the second view, a distance between a position of the external object and a photographing position of the first image, or a distance between the external object and a photographing position of the second image.

According to various embodiments, the acquiring operation may include the operation of acquiring the first image photographed through the electronic device, and the second image photographed through an external device for the electronic device.

According to various embodiments, the operation of generating the image data may include the operation of using at least one portion commonly included in first image data about the first image and second image data about the second image, to compress the first image data and the second image data into image data including the at least one portion.

According to various embodiments, the operation of generating the image data may include the operation of generating data capable of directly extracting the first image or the second image from the image data.

According to various embodiments, the acquiring operation may include the operation of, if the first image is a zoomed-in image, acquiring the remaining portion excepting the first image among the entire image sensed through a camera module operatively connected with the electronic device.

According to various embodiments, the operation of generating the relation information may include the operation of checking a third feature from the remaining portion, generating relation information related to the second image and the remaining portion, based on that the second feature and the third feature are similar with each other, and generating other image data including at least a part of the second image or at least a part of the remaining portion, based on the relation information.

According to various embodiments, the operation of generating the image data may include the operation of generating the image data, based on synchronization information for matching the first image and the second image on a basis of the same time.

According to various embodiments, the operation of generating the image data may include the operation of transmitting at least one of the image data or the relation information, to at least one external device for the electronic device.

According to various embodiments, the transmitting operation may include the operation of transmitting at least one of the image data or the relation information to the external device for the electronic device, by periods or in response to a specific event.

According to various embodiments, the operation of generating the image data may include the operation of inserting at least a part of the relation information into at least one of a header of the image data, supplemental enhancement information thereof, video usability information thereof, or metadata thereof.

According to various embodiments, a method processing multiple images may include the operations of acquiring relation information about a first image, and a second image related to the first image, using the relation information to display a connection guide for the second image through the display such that the connection guide for the second image is overlapped with at least a part of the first image and displaying the second image in response to at least one input related to the connection guide.

According to various embodiments, the operation of displaying the connection guide may include the operation of displaying at least one of a thumbnail window of a box or circle form, a graphic user interface, or a text.

According to various embodiments, the operation of displaying the connection guide may include the operation of acquiring other relation information about a third image related to the first image, and using the other relation information to display other connection guide for the third image through the display such that the other connection guide for the third image is overlapped with at least a part of the first image.

According to various embodiments, the operation of displaying the connection guide may include the operation of determining display positions of the connection guide and the other connection guide, based on a first photographing position of the second image (e.g., a vantage position from which the second image is captured) and a second photographing position of the third image (e.g., a vantage position from which the second image is captured).

According to various embodiments, a method processing multiple images may include the operations of displaying a photographing guide for at least one object included in a zone in which the connection guide and the other connection guide are overlapped with each other and, in response to at least one input to the photographing guide, focusing and photographing the at least one object through a camera module operatively connected with the electronic device.

According to various embodiments, the operation of displaying the connection guide may include the operation of displaying at least a part of the relation information, in relation with the connection guide.

According to various embodiments, the operation of displaying the second image may include the operation of sensing the movement direction of the electronic device, and displaying the second image, based on determination that the second image is an image photographed from a position being on the movement direction with respect to the electronic device.

According to various embodiments, the operation of displaying the second image may include the operation of displaying at least one of a relative angle of the first view and the second view, a distance between a position of the external object and a photographing position of the first image, or a distance between a position of the external object and a photographing position of the second image, through a display operatively connected with the electronic device.

An apparatus and method for processing multiple images according to various embodiments may associate other images corresponding to different views on an object with one image photographing the object, thereby providing an improved convenience of enabling a user to easily view an image of a different view on the object while viewing at least one image for the same object.

An apparatus and method for processing multiple images according to various embodiments may transmit/receive relation information representing that the multiple images are related to one another, to/from other devices, thereby being helpful for a user to efficiently manage the arbitrary multiple images using the relation information.

FIGS. 1-12 are provided as an example only. At least some of the operations discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a camera;
   a display;
   a memory; and
   at least one processor operatively coupled to the memory and the display, the at least one processor being configured to:
      control the display to display a first image being acquired via the camera as a preview image,
      control the display to display, according to a user request for zoom-in of the first image, a portion of the first image as zoomed in,
      capture, based on a user input, the portion of the first image,
      in response to the capturing the portion of the first image, acquire the portion of the first image and remaining portion of the first image to compare with a second image received from another electronic device,
      identify, based on analysis of the second image and the first image including the portion and the remaining portion, that both of the first image and the second image include at least one same object,
      in response to the identifying, generate information regarding environments from which the first image and the second image are acquired,
      generate, based on the information, data associating the portion of the first image with the second image, and
      store, in the memory, the data associating the portion of the first image with the second image.

2. The electronic device of claim 1, wherein the at least one processor is configured to identify that both of the first image and the second image include at least one same object based on analysis of at least one of a shape of an edge of the at least one same object, a color of the at least one same object, a text that is part of the at least one same object, or a position of the at least one same object.

3. The electronic device of claim 1, wherein the at least one processor is further configured to:
   in response to the identifying, generate, based on the data, a third image comprising at least a part of the at least one same object, and
   display the third image via the display.

4. The electronic device of claim 3, wherein the at least one processor is further configured to:
   in response to receiving a user input on a portion of the third image, display the portion of the first image or the second image according to the portion of the third image.

5. The electronic device of claim 1, wherein the at least one processor is further configured to, in response to the identifying, acquire at least one of an angle between a first viewing direction of the portion of the first image and a second viewing direction of the second image, a first distance between the at least one same object and the electronic device, a second distance between the at least one same object and the another electronic device, or a direction from the electronic device to the another electronic device, and
   wherein the at least one of the angle, the first distance, the second distance, or the direction is usable for generating the information or generating the data.

6. The electronic device of claim 1, wherein the information comprises at least one of information regarding a time at which the portion of the first image is captured, information regarding a time at which the second image is captured, information regarding a time interval during which the portion of the first image is captured, information regarding a time interval during which the second image is captured, information for accessing the portion of the first image, information for accessing the second image, or information regarding the at least one same object that is included in both the first image and the second image.

7. The electronic device of claim 6, wherein the at least one processor is further configured to:
   in response to receiving a user input on the portion of the first image, access the second image using the information for accessing the second image while displaying the portion of the first image via the display.

8. The electronic device of claim 6, wherein the at least one processor is further configured to:
   generate a third image, by arranging the portion of the first image and the second image in time order based on the time at which the portion of the first image is captured and the time at which the second image is captured, and
   store the third image in the memory.

9. The electronic device of claim 1, wherein the at least one processor is further configured to:
   acquire the portion of the first image according to camera settings of the another electronic device which is received from the another electronic device,
   wherein the another electronic device acquires the second image based on the camera settings of the another electronic device, and
   wherein the camera settings comprise at least one of a resolution or a shutter speed.

10. The electronic device of claim 1, wherein the at least one processor is further configured to:
    transmit to the another electronic device, at least one of the information regarding environments from which the first image and the second image are acquired or the data associating the portion of the first image with the second image.

11. The electronic device of claim 1, wherein the at least one processor is further configured to:
- superimpose a visual guidance on the portion of the first image while displaying the portion of the first image via the display based on the information, wherein the visual guidance is associated with the second image, and
- in response to receiving a user input on the visual guidance, display the second image via at least a portion of the display.

12. The electronic device of claim 1, wherein the at least one processor is further configured to transmit at least one of data regarding the portion of the first image, data regarding the remaining portion of the first image, data regarding the second image, or the information to at least one external device.

13. The electronic device of claim 12, wherein the at least one of data regarding the portion of the first image, data regarding the remaining portion of the first image, data regarding the second image, or the information is transmitted in response to detecting a designated event or periodically.

14. The electronic device of claim 1, wherein the processor is further configured to insert at least a part of the information into at least one of a header associated with the portion of the first image, supplemental enhancement information associated with the portion of the first image, video usability information associated with the portion of the first image, or metadata associated with the portion of the first image.

15. A method for image processing in an electronic device, comprising:
- displaying a first image being acquired via a camera of the electronic device as a preview image,
- displaying, according to a user request for zoom-in of the first image, a portion of the first image as zoomed in,
- capturing, based on a user input, the portion of the first image,
- in response to the capturing the portion of the first image, acquiring the portion of the first image and remaining portion of the first image to compare with a second image received from another electronic device,
- identifying, based on analysis of the second image and the first image including the portion and the remaining portion, that both of the first image and the second image include at least one same object,
- in response to the identifying, generating information regarding environments from which the first image and the second image are acquired,
- generating, based on the information, data associating the portion of the first image with the second image, and
- storing, in a memory of the electronic device, the data associating the portion of the first image with the second image.

16. The method of claim 15, further comprising:
- in response to the identifying, generating, based on the data, a third image comprising at least a part of the at least one same object, and
- displaying the third image via the display.

17. The method of claim 16, further comprising, in response to receiving a user input on a portion of the third image, displaying the portion of the first image or the second image according to the portion of the third image.

18. The method of claim 15, further comprising:
- acquiring the portion of the first image according to camera settings of the another electronic device which is received from the another electronic device,
- wherein the another electronic device acquires the second image based on the camera settings of the another electronic device, and
- wherein the camera settings comprise at least one of a resolution or a shutter speed.

* * * * *